(12) United States Patent
Wei et al.

(10) Patent No.: US 12,069,481 B2
(45) Date of Patent: Aug. 20, 2024

(54) KNN—BASED 6LoWPAN NETWORK INTRUSION DETECTION METHOD

(71) Applicant: CHONGQING UNIVERSITY OF POSTS AND TELECOMMUNICATIONS, Chongqing (CN)

(72) Inventors: Min Wei, Chongqing (CN); Yuan Zhuang, Chongqing (CN); Tao Yang, Chongqing (CN); Ping Wang, Chongqing (CN)

(73) Assignee: Chongqing University of Posts and Telecommunications, Chongqing (CN)

(*) Notice: Subject to any disclaimer, the term of this patent is extended or adjusted under 35 U.S.C. 154(b) by 726 days.

(21) Appl. No.: 17/261,872

(22) PCT Filed: Jun. 5, 2019

(86) PCT No.: PCT/CN2019/090137
§ 371 (c)(1),
(2) Date: Jan. 21, 2021

(87) PCT Pub. No.: WO2020/042702
PCT Pub. Date: Mar. 5, 2020

(65) Prior Publication Data
US 2021/0266748 A1     Aug. 26, 2021

(30) Foreign Application Priority Data
Aug. 29, 2018 (CN) .......................... 201810994988.6

(51) Int. Cl.
*H04W 12/122*     (2021.01)
*H04L 9/40*     (2022.01)
(Continued)

(52) U.S. Cl.
CPC ....... *H04W 12/122* (2021.01); *H04L 63/1425* (2013.01); *H04W 4/80* (2018.02);
(Continued)

(58) Field of Classification Search
CPC ..... H04W 12/122; H04W 4/80; H04W 12/69; H04W 24/08; H04W 84/18; H04L 63/1425; H04L 2101/659
See application file for complete search history.

(56) References Cited

U.S. PATENT DOCUMENTS

| | | | | |
|---|---|---|---|---|
| 6,944,673 B2 * | 9/2005 | Malan | ..................... | H04L 67/30 709/224 |
| 7,363,656 B2 * | 4/2008 | Weber | ..................... | H04L 63/00 713/153 |
| 8,001,601 B2 * | 8/2011 | Duffield | .............. | H04L 63/1425 713/188 |

(Continued)

FOREIGN PATENT DOCUMENTS

| | | | |
|---|---|---|---|
| AU | 2018100222 A4 | * | 3/2018 |
| CN | 101013976 A | * | 8/2007 |

(Continued)

*Primary Examiner* — Yonas A Bayou
(74) *Attorney, Agent, or Firm* — Michael D. Eisenberg

(57) ABSTRACT

The present invention relates to an improved KNN-based 6LoWPAN network intrusion detection method. The present invention selects quantifiable security features which can reflect a self-security state of network elements of a 6LoW-PAN network for training, and establishes a 6LoWPAN network feature space. The present invention assigns the weights to the features and transfers zero points, to alleviate the bias caused by large and small impact factors and simplify calculation; realizes construction and update of a state data table of network elements by extracting the feature data of network elements in real time, thus forming a normal contour updated according to the real-time state of the network in the feature space of the 6LoWPAN network (Continued)

based on the clustering effect of a KNN algorithm; and the present invention improves the KNN algorithm and redefines a basis for judging the invasion, to meet the requirements for 6LoWPAN network intrusion detection.

5 Claims, 5 Drawing Sheets

(51) Int. Cl.
| | |
|---|---|
| *H04L 29/06* | (2006.01) |
| *H04L 29/12* | (2006.01) |
| *H04W 4/80* | (2018.01) |
| *H04W 12/69* | (2021.01) |
| *H04W 24/08* | (2009.01) |
| *H04L 101/659* | (2022.01) |
| *H04W 84/18* | (2009.01) |

(52) U.S. Cl.
CPC ........... *H04W 12/69* (2021.01); *H04W 24/08* (2013.01); *H04L 2101/659* (2022.05); *H04W 84/18* (2013.01)

(56) References Cited

U.S. PATENT DOCUMENTS

| | | | | |
|---|---|---|---|---|
| 8,800,036 | B2* | 8/2014 | Khayam | H04L 63/1425 |
| | | | | 713/193 |
| 11,606,387 | B2* | 3/2023 | Doron | G06N 20/00 |
| 2002/0032717 | A1* | 3/2002 | Malan | H04L 63/1408 |
| | | | | 709/234 |
| 2002/0131366 | A1* | 9/2002 | Sharp | H04L 63/1441 |
| | | | | 370/252 |
| 2006/0173992 | A1* | 8/2006 | Weber | H04L 63/145 |
| | | | | 709/224 |
| 2006/0272018 | A1* | 11/2006 | Fouant | H04L 63/1416 |
| | | | | 726/23 |
| 2007/0283436 | A1* | 12/2007 | Duffield | H04L 63/1425 |
| | | | | 726/23 |
| 2017/0148077 | A1* | 5/2017 | Phillips | H04W 4/80 |

FOREIGN PATENT DOCUMENTS

| | | | | | |
|---|---|---|---|---|---|
| CN | 103731433 | A | * | 4/2014 | |
| CN | 104158800 | A | * | 11/2014 | |
| CN | 109120627 | A | * | 1/2019 | ......... H04L 61/6059 |

* cited by examiner (a)

(b)

KNN—BASED 6LoWPAN NETWORK INTRUSION DETECTION METHOD

TECHNICAL FIELD

The present invention belongs to the technical field of wireless communications, and relates to an improved KNN-Based 6LoWPAN network intrusion detection method.

BACKGROUND

IP is an important trend of the development of wireless sensor network technology, and adopting an IPV6 technology is the inevitable choice of IP of a wireless sensor network. The private protocol communication of an existing wireless sensor network is often related to specific applications, the expansibility and portability are poor, and users from an external network are difficult to directly access the nodes in the wireless sensor network. Through the IPV6 technology, the wireless sensor network can be seamlessly connected with the Internet, thereby realizing the free communication between people and people, people and objects, and objects and objects based on an IP protocol. The Internet Engineering Task Force (IETF) actively promotes wireless sensor network technology based on IPv6, and core standards such as 6LoWPAN, RPL, CoAP have been basically formulated, wherein, a bottom layer of the 6LoWPAN protocol adopts a physical layer and MAC layer protocol of IEEE 802.15.4, while a network layer cuts and optimizes the IPV6 protocol, which is suitable for the embedded IPV6 field, so that a large number of internet of things products can network with each other and also can be connected to a next-generation internet through the IPV6 protocol.

The wireless sensor network based on 6LoWPAN brings freedom, and at the same time, a security problem has become a major obstacle and bottleneck problem restricting the application and popularization thereof. Compared with a traditional wireless sensor network, 6LoWPAN has essential differences, and because of the IP protocol, the attacker has more potential attacks on 6LoWPAN. At the same time, the inherent potential safety hazards that 6LoWPAN has have not been properly solved.

A security protection mechanism provided by 6LoWPAN is insufficient to protect the ICMP abuse and Smurf attack caused by multicast in large-scale network due to heterogeneity and distribution in the process of neighbor discovery, path MTU discovery, address configuration, etc. In addition, UDP protocol does not need to provide a given source address in an authentication request packet, which can access the IP address spoofing attack introduced by a restricted network. The response request in a CoAP protocol introduces DoS attack caused by amplifying the risk and death of ping crashed due the fact that a network buffer is overloaded. The vulnerabilities brought by the collaboration conditions of layer protocols of these upper layer, security issues of the application layer protocol, the limitation of the application scenarios, etc., need to be specifically analyzed on the basis of architecture and theory. Solving a security problem of 6LoWPAN is the prerequisite for large-scale application thereof.

As an automatic security protection technology, intrusion detection can identify, evaluate and report the intrusion, and take active response measures. At present, the scale of the research on an IPV6 Internet intrusion detection system has been preliminarily established, but the research on the wireless sensor network intrusion detection based on IPV6 protocol is also less, the research on the intrusion detection mechanism based on 6LoWPAN has some solutions for one kind of attack, and this kind of research does not involve detection for unknown attacks.

In IPv6 network intrusion detection, due to the frequent change of streaming data, how to update a normal data profile online to realize the effective judgment of a node behavior is an urgent problem to be solved at present. In order to realize the intrusion detection based on the 6LoWPAN wireless sensor network, a new mechanism is needed, which can detect the intrusion online, and at the same time has the advantages of reliability, extensibility, independent learning, easy management, low maintenance cost, etc.

Some of current researches concentrate on adopting a K-near neighbor (KNN) algorithm to conduct abnormal assessment. The advantages of the KNN algorithm is that it can be used for nonlinear classification, and can generate decision boundary with arbitrary shape; and in addition, the KNN algorithm has lower training time complexity and higher accuracy, and the parameter K is not sensitive to noise. However, the KNN is difficult to be directly on the 6LoWPAN wireless sensor network. The essence of lazy learning makes it difficult for an abnormal detection scheme based on the KNN to be applied to online detection, especially when the communication costs are restricted. The lazy learning is driven through test data, each coming test data need to learn the normal profile independently online, which will produce greater calculation complexity (reflected in the distance calculation). Because the similarity between a test sample and a training sample needs to be calculated one by one, which consumes a great number of resources, at the same time, the sample also has an inbalanced problem (that is, some categories have large numbers of samples, while others have small numbers of samples), the selection and data preprocessing on parameters are needed, otherwise, a nearest neighbor classifier can make false prediction.

To sum up: since the features of a 1.6LoWPAN network are different from those of the traditional IPv6 network, the intrusion detection is difficult; and the node behavior of a 2.6LoWPAN network and the data flow in the network change frequently and randomly, so it is difficult to define the normal data profile which makes the online detection difficult.

For an intrusion detection problem of the 6LoWPAN network, the present invention comprehensively considers the features and operation mode of the 6LoWPAN network given by RFC4944, RFC7252 and RFC6550, proposes a 6LoWPAN network-oriented invasion detection architecture, and at the same time proposes an invasion detection mechanism based on the KNN improved algorithm, uses an improved lightweight algorithm to establish a profile model for a normal behavior, and can adjust the KNN parameters in real time to update and upgrade the profile model. This method can effectively detect DoS, address spoofing, man-in-the-middle attack and other typical intrusion attacks, and can provide redundant detection for unknown attacks to a certain extent.

SUMMARY

In view of this, the purpose of the present invention is to provide an improved KNN-based 6LoWPAN network intrusion detection method, which has a good generalization ability for unknown attack types and a certain robustness for network environment changes. The method has small memory and requires little or no prior knowledge.

To achieve the above purpose, the present invention provides the following technical solution:

An intrusion detection architecture of a 6LoWPAN network proposed in the present invention is shown in FIG. 1:

1. gateway: being responsible for protocol conversion between an outer net (WiFi/3G/4G/ethernet) and 6LoWPAN subnet;
2. 6R(6LoWPAN border router): one of nodes in a subnet, only used as a routing node forwarding data packet;
3. FFD(6LoWPAN FFD): a full function device (FFD) in the 6LoWPAN network, which can collect data and can achieve a forwarding function; and FFD needs to conduct statistics on the energy of the received and sent packets;
4. RFD(6LoWPAN RFD): a reduced function device (RFD) in the 6LoWPAN network, used as a node at the bottom of the network, which is only responsible for collecting the data and sending to a parent node or a router;
   a) Capturing module:
   i. accessing a data packet, finding and opening a specified network interface, monitoring all data packets on a shared network, and submitting to a data packet decoding module;
   ii. gathering information, comprising contents of network traffic, and states and behaviors of a user (client) connection activity.
   b) Decoding module: being responsible for parsing a header information field of the network data packet and placing results in a defined data structure.
   c) Preprocessing module: processing a datagram that needs to be decoded or reloaded before detection in the above results by a preprocessing function, so as to ensure the normal operation of detection.
5. MN(monitoring network element): selecting parts of network elements as monitoring network elements in an FFD, establishing a monitoring network, being responsible for regularly transmitting network related statistical information to the intrusion detection auxiliary device 2, passing to the gateway through the intrusion detection auxiliary device, and passing to an IDS console by the gateway to analyze an operation of the monitoring network elements. A principle of selecting the monitoring network established by the monitoring network element (MN) is as follows:
   (1) the number of network elements is as small as possible, to avoid unnecessary energy consumption;
   (2) the monitoring network element is reliable and has enough ability to handle a monitoring task, and can be competent for functions thereof;
   (3) the monitoring network covers the whole network.
6. intrusion detection console: comprising four parts: local database, security management software, intrusion detection software and intrusion response software:
   a) local database: the local database is responsible for storing the information collected through abnormal detection (for example, data packet header feature and intrusion detection method type and algorithm).
   b) intrusion detection software: establishing a normal behavior profile model.
   c) intrusion response software: if a deviation exceeds a threshold, an alarm will be triggered, and the security management software will be requested to send a corresponding control command and execute.
   d) security management software: the security management software is responsible for recording security events. The network information such as an address of a security event needs to be represented by a simple name, and a mapping relationship with an IP address should also be established.

After the establishment of the above network, a hybrid network topology is adopted in the 6LoWPAN subnet, and a multi-hop routing method is adopted to create DODAG according to a RPL routing protocol (RFC 6550) and specific applications. The monitoring network element (MN) will monitor the communication from the neighbors thereof (comprising parent network element and sub-network element). A network element (MN) creates a monitoring table for each of the neighbors thereof to store the monitoring data for the network element.

The judgment process of intrusion detection can be divided into direct judgment based on the feature of a certain network element and comprehensive judgment on the state data table of the network element established based on the features of several network elements. The specific process is as follows:

I. Learning Process

The concepts will appear high frequently below in the present invention: state data of network element $y_i$ and feature data of network element $y_{iq}$; in a learning process, the console will establish the state data table of network elements to cache the data and process the data in the table. The following contents will explain a construction method of the state data table of the network elements, a selection method of network element features, a capturing method of feature data of the network elements and an implementation object of the captured feature data.

1. State Data Table of Network Element

A state data table architecture of the network elements defined by the present invention is introduced firstly below. The network is shown in FIG. 1. Nodes are used for completing networking, and there are m network elements in the network. The present invention sets the state data sets of a plurality of network element cached in a table as $\{y_1 \ldots, y_i\}$. The present invention selects q features of the network elements of a 6LoWPAN network, and records the constructed feature set of network elements as {Feature1, Feature2, Feature q}, wherein, the state data of a certain network element x are reflected through the q features of network elements, and are recorded as $y_x = \{y_{x1}, \ldots, y_{xq}\}$. The number of the features of different network elements is q. After the network begins to operate, the feature data of all network elements are recorded by the console.

TABLE 1

State Data Table of Network Elements

| | action | | | | | |
|---|---|---|---|---|---|---|
| state | Feature 1 | Feature 2 | Feature 3 | Feature j | ... | Feature q |
| $y_1$ | $y_{11}$ | $y_{12}$ | $y_{13}$ | $y_{1i}$ | | $y_{1q}$ |
| $y_2$ | $y_{21}$ | $V_{22}$ | $y_{23}$ | $y_{2i}$ | | $y_{2q}$ |
| $y_3$ | $y_{31}$ | $y_{32}$ | $y_{33}$ | $y_{3i}$ | | $y_{3q}$ |
| ... | ... | ... | ... | ... | ... | ... |
| $y_m$ | $y_{m1}$ | $V_{m2}$ | $y_{m3}$ | $y_{m4}$ | | $y_{mq}$ |
| ... | ... | ... | ... | ... | ... | ... |
| $y_i$ | $y_{i1}$ | $y_{i2}$ | $y_{i3}$ | $y_{i4}$ | | $y_{iq}$ |
| ... | ... | ... | ... | ... | ... | ... |

A specific construction method in table 1 is started to be introduced below:

The method is mainly divided into three steps of:
(1) selecting the state data amount of network elements, thus determining the number of samples in the state data table of network elements(the number of rows)
(2) constructing a feature set of network elements, thus determining the features related to 6LoWPAN intrusion detection in the state data table of network elements, and determining the dimension of the data (the number of columns)
(3) filling the state data table of network elements
(4) conducting data preprocessing and completing orthogonal normalization processing The specific construction is as follows:

(1) Selection of the state data amount of network elements

The number of sample state data in the state data table of the network elements shall not be less than the number of the network elements in the network nor more than two times the total number of the network elements, that is, the number of samples that can find outliers is optimal. The state sets of several network elements cached in the table are set as $\{y_1, \ldots, y_i\}$. The present invention specifies m<i<2m. The present invention specifies three time periods of $T_0 \to T_1$, $T_1 \to T_2$ and $T_2 \to T_3$. Before $T_0$, the network has started and the node joining process is completed, as shown in FIG. 2. Before $T_0$, the network has started and the node joining process is completed. The acquisition for the state data set of $\{y_1, \ldots, y_m\}$ network element is completed in $T_0 \to T_1$; The acquisition for the state data set of $\{y_{m+1}, \ldots, y_i\}$ network element is completed in $T_1 \to T_2$; the update for the state data table of the network elements is completed in $T_2 \to T_3$, (that is, a previous cache is cleared and the new data are reloaded), and the specific updating method (updating process) is seen below in the present invention. Here, it should be noted that two time periods of $T_0 \to T_1$, and $T_1 \to T_2$ will pass only when the state data table of the network elements is firstly formed, and then a forming process in the table will follow the mode of a $T_2 \to T_3$ time period. In the firstly formed state data table of network elements, the states $y_{m+x}$ and $y_x$ are the states of the same network element in different time periods. As the table is updated, that is as similar as above, the state data of the i/p network elements will be captured in the $T_2 \to T_3$ time period, and p is score probability; at this time, the state sets of a plurality of network elements cached in the table are $$\left\{y_1, y_2, \ldots, y_{\frac{i}{p}}\right\};$$

m<i<2m; and the parameter p is used during an updating process and is a parameter in an updating algorithm. The value of p is specified by the console. At this time, the states $$y_{(m-1)+x}, y_{2(m-1)+x}, \ldots, y_{\left(\frac{2}{p}-1\right)(m-1)+x}$$

and $y_x$ are the states of the same network element in different time periods. The data in the table are updated after these state data are screened according to the probability of p. Since the states of the network elements in the table have been converted into the data, the console does not need to reflect time when the table is constructed, and the previous states of the network elements do not need to be replaced.

As stated above, the data amount of the states of the network elements will be determined in this step, as shown in Table 2.

TABLE 2

| State Data Amount of Network Elements |
| --- |
| mote state |
| $y_1$ |
| $y_2$ |
| ... |
| $y_m$ |
| ... |
| $y_i$ |

(1) Construction of Feature Set of Network Elements

Here, it should be further noted that some features are time-based statistical features of network traffic, that is, $$\frac{\text{The number of feature messages}}{\text{Time period}}.$$

In order to avoid the influence of time period on the statistical feature data, these features are uniformly represented by the "frequency of message occurrence";
the features are as follows:
Feature1: occurrence frequency of address unreachable response message, with the weight of $weight_1$;
Feature2: the number of topology changes/establishments in the time period, with the weight of $weight_2$;
Feature3: the number of sub-network elements calculated by a parent network element, with the weight of $weight_3$;
Feature4: differences that a proxy network element and an intrusion detection auxiliary device 1 detect a CON message, with the weight of $weight_4$;
Feature5: differences that the proxy network element and the intrusion detection auxiliary device 1 detect an ack message, with the weight of $weight_5$;
Feature6: frequency of response message occurrence when a message is overlarge, with the weight of $weight_6$;
Feature7: the number of certain sub-network element data packets received, with the weight of $weight_7$;
Feature8: the energy consumed of a certain sub-network element data packet received, with the weight of $weight_8$;
Feature9: forwarding rate of network element packet, with the weight of $weight_9$;

The weights are assigned according to an impact factor console of each feature, satisfying $\Sigma weight=1$. The assigned weights can reduce the bias caused by distinct features.

A process that a series of features of network elements in the table are constructed as feature sets is introduced below step by step.

Since the state data of the network elements in the table are captured at different times in the process of firstly forming the state data table of the network elements, the cases of capturing data in different ($T_0 \to T_1$, and $T_1 \to T_2$) time periods will be explained in the process of constructing the following feature set. Except that the cases of capturing data in different time period exists in the process of firstly forming the table, the other cases are that the data are captured in the same ($T_2 \to T_3$) time period.

The process of constructing the state data table of network elements in time sequence is described below in detail.

Firstly, describing a first forming process of the state data table of network elements:

in $T_0 \rightarrow T_1$ time period, a construction process is as shown in FIG. 3:

1) Network element feature Feature1

Capturing, by an intrusion detection auxiliary device 2, an address unreachable message that is returned to a network element, conducting statistical monitoring on the messages in $T_0 \rightarrow T_1$, monitoring the occurrence frequency, and recording the feature as $v_{icmp1}$.

This step is that recording the network element feature of $v_{icmp1}$ in the table, and the state data table of network elements becomes:

TABLE 3

Construction Process 2 of Feature Set of Network Elements

| mote action | $V_{icmp1}$ |
|---|---|
| $y_1$ | $y_{10}$ |
| $y_2$ | $y_{20}$ |
| $y_3$ | $y_{30}$ |
| ... | ... |
| $y_m$ | $y_{m0}$ |

2) Network element feature Feature2 and Feature3 a monitoring network element MN in $T_0 \rightarrow T_1$: detecting any change related to a preferred parent network element in the network element DIO message of the network (taking DODAG ID changes or levels of the network element to be an infinitive); and recording the feature as $Num_{topo}$. The monitoring network element MN in $T_0 \rightarrow T_1$, time period: detecting the increment of sub-network elements through parent network element statistics; and recording the feature as $Num_{sub}$. This step is that recording the features of $Num_{topo}$ and $Num_{sub}$ in the table, and the state data table of network elements becomes:

TABLE 4

Construction Process 3 of Feature Set of Network Elements

| mote action | $V_{icmp1}$ | $Num_{topo}$ | $Num_{sub}$ |
|---|---|---|---|
| $y_1$ | $y_{10}$ | $y_{11}$ | $y_{12}$ |
| $y_2$ | $y_{20}$ | $y_{21}$ | $y_{22}$ |
| $y_3$ | $y_{30}$ | $y_{31}$ | $y_{32}$ |
| ... | ... | ... | ... |
| $y_m$ | $y_{m0}$ | $y_{m1}$ | $y_{m2}$ |

3) Network element feature Feature4

An intrusion detection device and a proxy network element in $T_0 \rightarrow T_1$: conducting statistics on network element notification messages; comparing the difference between the notification messages obtained by both; and monitoring the difference number of the messages, and recording the feature as $\Delta CON$.

This step is that recording the feature of $\Delta CON$ in the table, and the state data table of the network element becomes:

TABLE 5

Construction Process 4 of Feature Set of Network Elements

| mote action | $V_{icmp1}$ | $Num_{topo}$ | $Num_{sub}$ | $\Delta CON$ |
|---|---|---|---|---|
| $y_1$ | $y_{10}$ | $y_{11}$ | $y_{12}$ | $y_{13}$ |
| $y_2$ | $y_{20}$ | $y_{21}$ | $y_{22}$ | $y_{23}$ |
| $y_3$ | $y_{30}$ | $y_{31}$ | $y_{32}$ | $y_{33}$ |
| ... | ... | ... | ... | ... |
| $y_m$ | $y_{m0}$ | $y_{m1}$ | $y_{m2}$ | $y_{m3}$ |

4) Network element feature Feature5 the intrusion detection auxiliary device 1 in $T_0 \rightarrow T_1$, time period: conducting statistics on the rate at which the gateway returns an ACK message; the proxy network element 6R in $T_0 \rightarrow T_1$, time period: conducting statistics on the ACK message rate; comparing the difference between the ACK messages obtained by both; and monitoring the difference number of the messages, and recording the feature as $\Delta ack$.

This step is that recording the feature of $\Delta ack$ in the table, and the state data table of the network element becomes:

TABLE 6

Construction Process 5 of Feature Set of Network Elements

| mote action | $V_{icmp1}$ | $Num_{topo}$ | $Num_{sub}$ | $\Delta CON$ | $\Delta ack$ |
|---|---|---|---|---|---|
| $y_1$ | $y_{10}$ | $y_{11}$ | $y_{12}$ | $y_{13}$ | $y_{14}$ |
| $y_2$ | $y_{20}$ | $y_{21}$ | $y_{22}$ | $y_{23}$ | $y_{24}$ |
| $y_3$ | $y_{30}$ | $y_{31}$ | $y_{32}$ | $y_{33}$ | $y_{34}$ |
| ... | ... | ... | ... | ... | ... |
| $y_m$ | $y_{m0}$ | $y_{m1}$ | $y_{m2}$ | $y_{m3}$ | $y_{m4}$ |

5) Network element feature Feature6 an intrusion detection auxiliary device 2 in $T_0 \rightarrow T_1$ time period: capturing an error report message returned to the network element, and conducting statistic detection on the message; monitoring the occurrence frequency and recording the feature as $v_{icmp2}$; and This step is that recording the feature of $v_{icmp2}$ in the table, and the state data table of network elements becomes:

TABLE 7

Construction Process 6 of Feature Set of Network Elements

| mote action | $V_{icmp1}$ | $Num_{ccpo}$ | $Num_{sub}$ | $\Delta CON$ | $\Delta ack$ | $V_{icmp2}$ |
|---|---|---|---|---|---|---|
| $y_1$ | $y_{10}$ | $y_{11}$ | $y_{12}$ | $y_{13}$ | $y_{14}$ | $y_{15}$ |
| $y_2$ | $y_{20}$ | $y_{21}$ | $y_{22}$ | $y_{23}$ | $y_{24}$ | $y_{25}$ |
| $y_3$ | $y_{30}$ | $y_{31}$ | $y_{32}$ | $y_{33}$ | $y_{34}$ | $y_{35}$ |
| ... | ... | ... | ... | ... | ... | ... |
| $y_m$ | $y_{m0}$ | $y_{m1}$ | $y_{m2}$ | $y_{m3}$ | $y_{m4}$ | $y_{m5}$ |

6) Network element energy feature

FFD and 6R in $T_0 \rightarrow T_1$, time period: conducting statistics on the self-energy, and processing the message obtained through the statistics, to obtain the energy feature. Thus, the state data table of the network element becomes:

TABLE 8

State Data of Network Elements in $T_0 \rightarrow T_1$

| | | | | action data | | | | | |
|---|---|---|---|---|---|---|---|---|---|
| state | $v_{icmp1}$ | $Num_{topo}$ | $Num_{sub}$ | $\Delta$-CON | $\Delta$-ack | $V_{icmp2}$ | $RCV_{ik}$ | Energy-Rcv | Rate$_{forward}$ |
| $y_1$ | $y_{10}$ | $y_{11}$ | $y_{12}$ | $y_{13}$ | $y_{14}$ | $y_{15}$ | $y_{16}$ | $y_{17}$ | $y_{18}$ |
| $y_2$ | $y_{20}$ | $y_{21}$ | $y_{22}$ | $y_{23}$ | $y_{24}$ | $y_{25}$ | $y_{26}$ | $y_{27}$ | $y_{28}$ |
| $y_3$ | $y_{30}$ | $y_{31}$ | $y_{32}$ | $y_{33}$ | $y_{34}$ | $y_{35}$ | $y_{36}$ | $y_{37}$ | $y_{38}$ |
| ... | ... | ... | ... | ... | ... | ... | ... | ... | ... |
| $y_m$ | $y_{m0}$ | $y_{m1}$ | $y_{m2}$ | $y_{m3}$ | $y_{m4}$ | $y_{m5}$ | $y_{m6}$ | $y_{m7}$ | $y_{m8}$ |

In $T_1 \rightarrow T_2$ time period, a construction process of the state data table of the network elements is as shown in FIG. 4(a). In $T_1 \rightarrow T_2$ time period, the feature data of network elements are captured, and a capturing mode and a specific implementation object are the same.

TABLE 9

State Data of Network Elements in $T_1 \rightarrow T_2$

| | | | | action data | | | | | |
|---|---|---|---|---|---|---|---|---|---|
| state | $v_{icmp1}$ | $Num_{topo}$ | $Num_{sub}$ | $\Delta$-CON | $\Delta$-ack | $V_{icmp2}$ | $RCV_{ik}$ | Energy-Rcv | Rate$_{forward}$ |
| $y_m$ | $y_{m0}$ | $y_{m1}$ | $y_{m2}$ | $y_{m3}$ | $y_{m4}$ | $y_{m5}$ | $y_{m6}$ | $y_{m7}$ | $y_{m8}$ |
| ... | ... | ... | ... | ... | ... | ... | ... | ... | ... |
| $y_i$ | $y_{i0}$ | $y_{i1}$ | $y_{i2}$ | $y_{i3}$ | $y_{i4}$ | $y_{i5}$ | $y_{i6}$ | $y_{i7}$ | $y_{i8}$ |

In $T_0 \rightarrow T_2$ time period, the feature data of network elements are captured in two time periods, as shown in table 11, and the obtained data are in a firstly constructed state data table of the network element after the network is started.

TABLE 10

First State Data Table of Network Elements

| | | | | action data | | | | | |
|---|---|---|---|---|---|---|---|---|---|
| state | $v_{icmp1}$ | $Num_{topo}$ | $Num_{sub}$ | $\Delta$-CON | $\Delta$-ack | $V_{icmp2}$ | $RCV_{ik}$ | Energy-Rcv | Rate$_{forward}$ |
| $y_1$ | $y_{10}$ | $y_{11}$ | $y_{12}$ | $y_{13}$ | $y_{14}$ | $y_{15}$ | $y_{16}$ | $y_{17}$ | $y_{18}$ |
| $y_2$ | $y_{20}$ | $y_{21}$ | $y_{22}$ | $y_{23}$ | $y_{24}$ | $y_{25}$ | $y_{26}$ | $y_{27}$ | $y_{28}$ |
| $y_3$ | $y_{30}$ | $y_{31}$ | $y_{32}$ | $y_{33}$ | $y_{34}$ | $y_{35}$ | $y_{36}$ | $y_{37}$ | $y_{38}$ |
| ... | ... | ... | ... | ... | ... | ... | ... | ... | ... |
| $y_m$ | $y_{m0}$ | $y_{m1}$ | $y_{m2}$ | $y_{m3}$ | $y_{m4}$ | $y_{m5}$ | $y_{m6}$ | $y_{m7}$ | $y_{m8}$ |
| ... | ... | ... | ... | ... | ... | ... | ... | ... | ... |
| $y_i$ | $y_{i0}$ | $y_{i1}$ | $y_{i2}$ | $y_{i3}$ | $y_{i4}$ | $y_{i5}$ | $y_{i6}$ | $y_{i7}$ | $y_{i8}$ |

In $T_2 \rightarrow T_3$ time period, the capturing mode and the specific implementation object of the feature data of the network elements are the same, and the construction process is as shown in FIG. 4(b). In $T_2 \rightarrow T_3$ time period, the state data of $$\frac{i}{p} (p \text{ is score probability})$$

network elements will be captured, and the state of network elements in the network needs to be captured with $$\left\lfloor \frac{i}{p \times m} \right\rfloor$$

time period in $T_2 \rightarrow T_3$ time period. $\lfloor x \rfloor$ is a function representation for an integer part of a decimal. The finally constructed state data table of the network element are shown in Table 11 below:

TABLE 11

State Data Table of Network Elements in $T_2 \rightarrow T_3$

| | | | | action data | | | | | |
|---|---|---|---|---|---|---|---|---|---|
| state | $v_{icmp1}$ | $Num_{topo}$ | $Num_{sub}$ | $\Delta$CON | $\Delta$ack | $v_{icmp2}$ | $Rcv_{ik}$ | EnergyRcv | Rate$_{forward}$ |
| $y_1$ | $y_{10}$ | $y_{11}$ | $y_{12}$ | $y_{13}$ | $y_{14}$ | $y_{15}$ | $y_{16}$ | $y_{17}$ | $y_{18}$ |
| $y_2$ | $y_{20}$ | $y_{21}$ | $y_{22}$ | $y_{23}$ | $y_{24}$ | $y_{25}$ | $y_{26}$ | $y_{27}$ | $y_{28}$ |
| $y_3$ | $y_{30}$ | $y_{31}$ | $y_{32}$ | $y_{33}$ | $y_{34}$ | $y_{35}$ | $y_{36}$ | $y_{37}$ | $y_{38}$ |
| ... | ... | ... | ... | ... | ... | ... | ... | ... | ... |
| $y_m$ | $y_{m0}$ | $y_{m1}$ | $y_{m2}$ | $y_{m3}$ | $y_{m4}$ | $y_{m5}$ | $y_{m6}$ | $y_{m7}$ | $y_{m8}$ |
| ... | ... | ... | ... | ... | ... | ... | ... | ... | ... |
| $y_i$ | $y_{i0}$ | $y_{i1}$ | $y_{i2}$ | $y_{i3}$ | $y_{i4}$ | $y_{i5}$ | $y_{i6}$ | $y_{i7}$ | $y_{i8}$ |
| $y_{i+1}$ | $y_{i'0}$ | $y_{i'1}$ | $y_{i'2}$ | $y_{i'3}$ | $y_{i'4}$ | $y_{i'5}$ | $y_{i'6}$ | $y_{i'7}$ | $y_{i'8}$ |
| ... | ... | ... | ... | ... | ... | ... | ... | ... | ... |
| $y_{2i}$ | $y_{i'0}$ | $y_{i'1}$ | $y_{i'2}$ | $y_{i'3}$ | $y_{i'4}$ | $y_{i'5}$ | $y_{i'6}$ | $y_{i'7}$ | $y_{i'8}$ |
| ... | ... | ... | ... | ... | ... | ... | ... | ... | ... |
| $y_{\frac{i}{p}}$ | $y_{i'0}$ | $y_{i'1}$ | $y_{i'2}$ | $y_{i'3}$ | $y_{i'4}$ | $y_{i'5}$ | $y_{i'6}$ | $y_{i'7}$ | $y_{i'8}$ |

After the completion of the construction for the state data table of the network elements, the processing mode of the console for specific feature data of the network elements in the state data table of the network elements will be specifically explained below.

(3) Data Preprocessing after the State Data Table of the Network Elements is Filled 1) Denoising process:

The console checks whether there are some non-numerical variables and obviously unreasonable data in the state data table of the network elements, which are invalid; after the denoising process, the feature data set of the network elements of the nth feature in the table is set as $y_{1n}=\{y_{1n}, y_{2n}, \ldots, y_{in}\}$, i.e., the nth column of the state data table of the network elements. The threshold values of the $y_{1n}$ set are $\max_n$ and $\min_n$, where $\min_n$ is a minimum value in the set and $\max_n$ is a maximum value;

2) at this time, the console needs to pre-process a threshold range of each feature, and the console converts the threshold range of each feature ($\min_i$, $\max_i$) to that between (0,1) through normalization function processing, that is, an eigenvalue is converted to $$\frac{v_{in}}{|\max_n - \min_n|};$$

and in addition, the console also needs to rematch the weight of each feature according to the impact factor of the feature;

3) since the console constructs q dimensional coordinate space, q=10, the feature data of the network elements in the state data table of the network elements need to be located in the coordinate space; and q=10 at this point, the console introduces an echo coefficient c to transfer zero, so that the entire feature space is moved to the positive coordinate space, where the coefficient c is set to:

c>|min|,min=min{$\min_i$,i=1,2, . . . ,q},

2. Selecting and capturing modes of the features of network elements;

Special attention should be paid to the fact that parts of features of the network elements analyzed below are not listed in the state data table of the network elements. for three reasons:

1) the change of parts of features of the network elements is a decisive feature to judge the abnormity, which does not need the analysis of an intrusion detection mechanism to be judged as abnormity directly;

2) parts of features of the network elements are only responsible for coordinating other features, and do not need to be recorded in the state data table of the network elements; and 3) parts of features only belong to specific functional network elements, which cannot represent the features of network elements in the whole network and are not universal.

In the present invention, the features are screened and finally determined below step by step by analyzing network features.

In addition, in the process of selecting the following features, all frequency limits are hypothetical, with a view to illustrating that these features can reflect the secure state of the network elements to a certain extent. The intrusion detection mechanism is proposed in the present invention just because of unpredictability and dynamic variability of limiting value of the network features.

Process 1: Address Assignment and Resolution a gateway and 6R are connected to a network, and an address is fixedly assigned; then, after the network elements FFD and RFD are connected to the network, the FFD and RFD send a request information RS message to directly connect a 6R to request an IPV6 address. After the 6R receives the RS message, the RA message is replied (RA is used for configuring address prefixes, the network elements use the prefixes to configure IP addresses, and the parameters for configuring the network comprise an MTU, a hop limit, and a life value TTL), and the RFD and the FFD obtain the IP addresses (MAC addresses owned by the RFD and the FFD are converted to an interface ID through an EUI-64, and a link prefix obtained through the RA message is added).

in the above process, the execution action steps of each unit in the network and the execution step of which the network element in the network and the intrusion detection auxiliary device capture the feature data are as follows:

Each time the 6R network element sends a RA message, the intrusion detection auxiliary device 1 (close to the 6R network element) captures the RA message in the $T_0 \rightarrow T_1$, $T_1 \rightarrow T_2$ and $T_2 \rightarrow T_3$ time periods respectively, and parses and compares the RA message contents; and captures different messages from the 6R, wherein the address prefixes are respectively:

prefix$_1$,prefix$_2$, . . . ,prefix$_n$ the intrusion detection auxiliary device sends this message to the console, which parses the message and extracts the address prefix, and performs an XOR operation on the address prefix.

if prefix$_1 \oplus$prefix$_2 \oplus$ . . . $\oplus$prefix$_n$=1, the 6R network element is abnormal; if prefix$_1 \oplus$prefix$_2 \oplus$ . . . $\oplus$prefix$_n$=0, the 6R network element is normal; in addition, the intrusion detection auxiliary device 1 statistically monitors the frequency of the RA message that the 6R network element occur in $T_0 \rightarrow T_1$, $T_1 \rightarrow T_2$ and $T_2 \rightarrow T_3$, and suppose the 6R network element is under normal condition, the occurrence frequency of the RA message is $v_{na}$: if $v > v_{na}$, the 6R network element is abnormal; if $v < v_{na}$, the 6R network element is normal; and the above detection process is only for 6R. Therefore, the features of the RA message are not listed in the constructed feature set. But the state of the 6R network element can be judged in sequence.

The intrusion detection auxiliary equipment 2 monitors NS messages of subnet intranet elements in $T_0 \rightarrow T_1$, $T_1 \rightarrow T_2$ and $T_2 \rightarrow T_3$ time periods respectively. Once any network element receives the NS frequency exceeding the limit, the subnet intranet elements are actively detected, that is, and the subnet intranet elements send NS messages in reverse. If NA is not returned, or NA messages from other MAC addresses are received, the behavior is proved to be abnormal, ND table entries are not updated, and the behavior is reported to the console. Supposing that the network element is under normal condition, the frequency limit of the received NS message is $v_{limit-ns}$, and suppose a source IP address of the received NS message is Address0, the source IP address of the returned NA message is Address1. if $v_{ns} > v_{limit-ns}$, the NS message is sent in reverse; Step 1: if the NA message is not returned, the network element is abnormal; Step 2: if the NA message is returned, the IP address is compared; Address0$\oplus$Address1=1, the network element is abnormal; Address0⊕Address1=0, the network element is normal; if $v_{ns} < v_{limit-ns}$, the network element is normal;

If the destination address of the data packet is not in the network elements (FFD and 6R) cache, that is, when the data packet is targeted in the network element address, and if it does not exist or has not received a reply, and has not received a response for a long time, the destination address is unreachable. Therefore, it is necessary for an adaptation layer to provide an address unreachable message, and it is necessary to return an address unreachable message to the network element that sends the data packet, i.e., an error reporting message of ICMPv6 specification.

The intrusion detection auxiliary device 2 captures the address unreachable message returned to the network element and detects the message rate. Once the rate exceeds the threshold, it illustrates that the destination address does not exist in the network, or there is a malicious use condition. The intrusion detection auxiliary device 2 filters and extracts the ICMP message in $T_0 \rightarrow T_1$, $T_1 \rightarrow T_2$ and $T_2 \rightarrow T_3$. Supposing that $\bar{t}_m$ (m=0, 1, 2) is the starting time, $\bar{t}_{m+1}$ is the end time, and $\bar{t}_m \rightarrow \bar{t}_{m+1}$ is a fixed time period, which can be understood as a time window.

a is the number of the ICMP error response messages received by certain network elements (FFD and 6R) in $\bar{t}_m \rightarrow \bar{t}_{m+1}$, Timestamp, represents a timestamp of the 1th error response message received by certain network elements (FFD and 6R) in $\bar{t}_m \rightarrow \bar{t}_{m+1}$, and Timestamp, represents the timestamp of the a th error response message received in $\bar{t}_m \rightarrow \bar{t}_{m+1}$. Timestamp, represents the time of xth message received in $\bar{t}_m \rightarrow \bar{t}_{m+1}$.

TABLE 10

Data Capturing Table

| ICMP Type | "Address Unreachable" Response |
|---|---|
| the number of messages received by certain network elements (FFD and 6R) within $\bar{t}_m \rightarrow \bar{t}_{m+1}$ | a\|\|Timestamp$_1$\|\|Timestamp$_a$ |

$$v_{icmp1} = \frac{a}{(\text{Timestamp}_a - \text{Timestamp}_1)}$$

is the occurrence frequency of error response messages received by the injured network element within $\bar{t}_m \rightarrow \bar{t}_{m+1}$.

If the network is normal and not invaded, the maximum frequency of the received error response messages is V'max.

(1) if $$v_{icmp1} = \frac{a}{(\text{Timestamp}_a - \text{Timestamp}_1)} > V'_{max},$$

the intrusion detection auxiliary device 2 determines that the network element is injured;

(2) if $$v_{icmp1} = \frac{a}{(\text{Timestamp}_a - \text{Timestamp}_1)} \leq V'_{max},$$

the network element is normal;

for Feature1, above features are established in this step: weight$_1$: frequency of address unreachable message, and the weight is set as weight$_1$ Process 2: Establishment of Network Routing The device is routed according to RFC6550. It should be noted in advance that the network element needs to be divided into sub-network element and parent network element, and measured by a rank value, and the higher the level, the smaller the rank value is and ETX value are. The networking is conducted in the initial state that the 6R joins DAG, the 6R network element that have joined to the DAG will regularly send the DIO message of multicast addresses. In addition, the network element (RFD or FFD) requested to join in can also make the 6R network element respond to the DIO message by sending a DIS message. The network element in the DAG will regularly send a DAO message (containing prefix information that the network element uses) to upper-level network element. After the upper-level receives the DAO message, the prefix information of the sub-network element will be cached, and DAO-ACK is responded. In the above process, an intrusion detection mechanism performs the following steps:

In this process, the present invention uses monitoring network elements to capture, analyze data and extracts the data. The information from an MN monitoring list comes from DIO and DAO messages that determine the network elements. MN monitoring list:
  i. a network element ID and a rank thereof
  ii. the preferred parent network element ID of the network element and the rank thereof
  iii. the number of topology changes/establishment of the network element in the time period
  iv. an ETX value of the network element (obtained from a DIO message broadcast by the network element)
  v. the change of the network element as the parent network element (from DAO messages of other network elements)
  vi. the number of sub-network elements calculated by a parent network element item It is required that the sent and received network elements along a route are obliged to check whether a rank rule is broken, and a rank-error bit is set in the RPL packet information, to ensure that a rank value cannot be faked; in the above process, the execution step of which the network element in the network and the intrusion detection auxiliary device capture the feature data are as follows:

each monitoring network element is responsible for the behavior flow of a network element object within a monitoring range in $T_0 \rightarrow T_1$, $T_1 \rightarrow T_2$ and $T_2 \rightarrow T_3$. When the monitoring network element hears the DIO message from the network element object for the first time, it indicates that the topology setting starts and the state changes. Then, the monitoring network element extracts all the necessary information (i.e., a monitoring list) in the specific entries of the objects in a monitoring table thereof from the DIO and DAO messages, to determine the control messages sent or received by the monitored network element objects:

1) If MN detects any change related to a preferred parent network element in the DIO message, that is, the DODAG ID changes or level of the network element becomes an infinitive, and the state change is recorded; if the state changes frequently and the number of changes exceeds the threshold, any network element behavior that results in a local repair will be recorded in the monitoring network element; and the network element that results in the local repair is abnormal;

for Feature2, the above features are established in this step: the number of topology changes/establishment in the time period (i.e., the number of changes), and the weight is set as weight$_2$;

2) an MN receives level information during DIO check, and if the monitoring network element detects any child/parent relationship that breaks a rank rule, the network element with changed rank is abnormal; this feature means that once the rank value changes, the sending or receiving network elements along a route check that the rank rule is broken, and the rank-error bit in RPL packet information becomes 1, which illustrates that the network element is abnormal; and this feature means the rank value change is directly judged to be abnormal, and the rank-error bit change needs not be listed in the feature set of network elements;

3) when MN detects that the ETX relationship between the parent network element and the sub-network element in a monitoring list is broken, that is, the ETX value of the parent network element is large and the route is invalid, and at this time, RPL starts a local repair mechanism to restore the network routing topology; and if the number of the sub-network elements calculated by the parent network element item increases beyond the threshold value, the threshold value depends on the fluctuation of a network environment and a network size, that is, when the network element broadcasts, the ETX value thereof decreases and at the same time the increase of sub-network element thereof exceeds the threshold value, showing that the sub-network element is invaded; and the network element is necessarily abnormal;

thus, two features such as the ETX value of the network element and the increment number of the sub-network elements are known to jointly judge the security state of the network element; the increment number of the sub-network elements is the quantity of state, which cannot be recorded in the state data table of the network element, thus, "the number of the sub-network elements calculated by the parent network element item" is recorded in the state data table of the network element, and the ETX value of the network element cooperates with this feature of "the number of the sub-network elements calculated by the parent network element item", and when the ETX value of the network element decreases, this feature of "the number of the sub-network elements calculated by the parent network element item" is recorded; and if the ETX value of the network element does not decrease, this feature has no influence, and both the eigenvalue and the weight thereof are set to 0;

the feature of the number of the sub-network elements calculated by the parent network element item is taken as a factor, and the weight is set as Feature3;

Process 3: Acquisition of Network Resource State—CoAP Subscription Model

The application layer uses a CoAP protocol subscriber pattern to collect information. A CoAP Client observes the resources on a Server, the Client subscribes the resources to the Server, and only the resource state changes, the Server will notify the Client of new state of the resources. It should be noted that Client is the gateway for each DODAG (i.e. 6R), the Server is a subnet Intranet element (FFD), and the Proxy is the RFD in the subnet.

In the above process, the execution action steps of each unit in the network and the execution step of which the network element in the network and the intrusion detection auxiliary device capture the feature data are as follows:

when a client 6R needs data (the get message is sent), the intrusion detection auxiliary device 1 needs to statistically monitor the get message from 6R captured in $T_0 \to T_1$, $T_1 \to T_2$ and $T_2 \to T_3$, and calculate the occurrence frequency of the get message, and once the frequency exceeds the limit threshold, it illustrates that the 6R network element is abnormal.

The above feature (occurrence frequency of get message) is only for 6R, so the occurrence frequency of the get message is not listed in the feature set.

In another case, when the data changes, the network element subscribed by each agent client sends notification to the client as a request response, and the notification is a CON message. The intrusion detection device 1 also captures the CON message sent to 6R and statistically calculates the notification rate from each network element. Each agent network element 6R(i.e., a network element that does not collect information but only forwards) needs to statistically monitor the information in $T_0 \to T_1$, $T_1 \to T_2$ and $T_2 \to T_3$:

i. the number of the forwarded get messages
ii. the number of CON messages from different network elements Once a certain network element is detected to send notifications too frequently, exceeding the threshold value, it illustrates that the network is abnormal, and at this point, it is impossible to determine whether the proxy network element is abnormal or the network element in a sub-network (i.e., the server) is abnormal, therefore, the statistical information by the intrusion detection device 1 and the proxy network element is compared.

Supposing that $\Delta CON = |CON_{proxy} - CON_{IDS}|$, if $\Delta CON$ is overlarge, the console further compares $CON_{proxy} - CON_{IDS}$; and if $CON_{proxy} - CON_{IDS} > 0$, the proxy network element can be abnormal. If $CON_{proxy} - CON_{IDS} < 0$, the server can be abnormal.

The notification is the CON message, 6R and the proxy network element need ACK to respond to the CON message, and if the ACK response is not received for a long time, the client will automatically cancel the subscription to the server network element. The intrusion detection auxiliary device 1 needs to statistically monitor the occurrence rate at which the gateway returns the ACK message in $T_0 \to T_1$, $T_1 \to T_2$ and $T_2 \to T_3$; and the proxy also needs to statistically monitor the occurrence frequency of the ACK message in $T_0 \to T_1$, $T_1 \to T_2$ and $T_2 \Rightarrow T_3$.

If the occurrence frequency of the ACK message is significantly lower than that of the CON message, it illustrates that the gateway or the proxy network element is abnormal; and at this time, the occurrence frequency of the statistical ACK message by the gateway and the proxy network element are compared to further judge the abnormity. The judgment for the CON message is similar, which will not be repeated herein in detail. In the above two features, the occurrence frequencies of CON messages captured respectively by the proxy network element and the intrusion detection auxiliary device are related.

the establishment of Feature4 and Feature5 is completed;

Feature4: $\Delta CON = |CON_{proxy} - CON_{IDS}|$, with the weight of $weight_4$;

Feature5: $\Delta ack = |ack_{proxy} - ack_{IDS}|$, with the weight of weight5;

During the data packet uploading process, if the data packet exceeds the current network element MTU, the data packet will be discarded and an ICMP error report message will be returned. The intrusion detection auxiliary device 2 filters and extracts ICMP messages in $T_0 \to T_1$, $T_1 \to T_2$ and $T_2 \to T_3$. Supposing that $\bar{t}_m$ (m=0, 1, 2) is the starting time and $\bar{t}_{m+1}$ is the end time, and $\bar{t}_m \to \bar{t}_{m+1}$ is a fixed time period, which can be understood as a time window. bis the number of ICMP error response message received in $\bar{t}_m \to \bar{t}_{m+1}$, Timestamp₁ represents a timestamp of the 1st error response message received in $\bar{t}_m \to \bar{t}_{m+1}$, and Timestamp, represents a timestamp of the bth error response message received in $\bar{t}_m \to \bar{t}_{m+1}$. Timestamp is the time of xth message received in $\bar{t}_m \to \bar{t}_{m+1}$.

TABLE 11

| Data Capturing Table | |
|---|---|
| ICMP Type | "Message overlarge" Response |
| the number of messages received by certain network elements (FFD and 6R) | b‖Timestamp₁‖Timestamp_b. |

$$v_{icmp2} = \frac{b}{(Timestamp_{b'} - Timestamp_{1'})}$$

is the occurrence frequency of the error response message received by the injured network element in $\bar{t}_m \to \bar{t}_{m+1}$.

If the network is normal and not invaded, the maximum frequency of the received error response message is $V_{max}$.

(3) if $$v_{icmp2} = \frac{b}{(Timestamp_{b'} - Timestamp_{1'})} > V_{max},$$

the network element is injured; and (4) if $$v_{icmp2} = \frac{b}{(Timestamp_{b'} - Timestamp_{1'})} \leq V_{max},$$

the network element is normal;

Feature7 the establishment is completed.

Feature6:

$$v_{icmp2} = \frac{b}{(Timestamp_{b'} - Timestamp_{1'})},$$

with the weight of weight₇.

During a normal operation of the network, an FFD and a 6R need to conduct energy statistics. The specific measures are as follows:

The FFD and the 6R store neighbor information in a routing registry. A neighbor table and DODAG are as follows:

four network elements k1, k2, A, B are supposed;

k1, k2 forwards data to A, and A forwards the data to B; and supposing that $Rcv_{Ak1}$ is the number of the data packets that A receives k1, $Rcv_{Ak2}$ is the number of the data packets that A receives k1, $Rcv_{Ak}$ is the number of the data packets that A receives all next-level network elements (k1 and k2), and $Sent_A$ is the number of the data packets that A forwards to an upper-level network element B.

TABLE 12

| Neighbor Table (k→A→B) of Network Element A | | |
|---|---|---|
| Next-level neighbor | K1 | K2(Additional next-level element of A, considered with K1 in the same way) |
| Upper-level neighbor | B | |

TABLE 13

| DODAG Table of Network Element A | |
|---|---|
| Destination Address | Forwarded Network Element |
| Others | B |
| B | B |
| K1 | K1 |
| K2 | K2 |

The network element A needs to attach a timestamp to the data packets received and sent thereby, so as to conduct periodic energy statistics, and the statistical energy is used as the key security information on abnormal detection. Supposing that $\bar{t}_m$ (m=0,1,2) is the starting time, $\bar{t}_{m+1}$ is the end time, and $\bar{t}_m \to \bar{t}_{m+1}$ is a fixed time period, which can be understood as a time window. The processing mode and maintenance table of the data packet by network element A are as follows:

TABLE 14

| Processing Mode of the Received Packet by Network Element A | |
|---|---|
| Received Packet | After Processing |
| M1 | M₁‖Timestamp_{M1} (Certain time $\bar{t}_{m\alpha 1}$ in $\bar{t}_m \to \bar{t}_{m+1}$, $\bar{t}_{m\alpha} < \bar{t}_{m\alpha 1} < \bar{t}_{m+1}$, and $\bar{t}_{m\alpha 1}$ is time that the network element A receives M1) |
| M2 | M₁‖Timestamp_{M2} (Certain time $\bar{t}_{m\alpha 2}$ in $\bar{t}_m \to \bar{t}_{m+1}$, $\bar{t}_{m\alpha} < \bar{t}_{m\alpha 2} < \bar{t}_{m+1}$, and $\bar{t}_{m\alpha 2}$ is time that the network element A receives M2) |
| ... | ... |
| $M_{Rcv_{Ak1}}$ | $M_{Rcv_{Ak1}} \| Timestamp_{M_{Rcv_{Ak1}}}$ (Certain time $\bar{t}_{M\alpha Rev_{Ak1}}$ in $\bar{t}_m \to \bar{t}_{m+1}$, $\bar{t}_m < \bar{t}_{m\alpha Rcv_{ik1}} < \bar{t}_{m+1}$, and $\bar{t}_{m\alpha Rcv_{Ak1}}$ is the time that the network element A receives $M_{Rcv_{Ak1}}$) |
| $M_{Rev_{Ak1}+1}$ | $M_{Rcv_{Ak1}+1} \| Timestamp_{M_{Rcv_{Ak1}}+1}$ (Certain time $\bar{t}_{m\alpha Rcv_{Ak1}}$ out of $\bar{t}_m \to \bar{t}_{m+1}$, $\bar{t}_m < \bar{t}_{m+1} < \bar{t}_{m\alpha Rcv_{Ak1}} < \bar{t}_{m+2}$, and $\bar{t}_{m\alpha Rcv_{Ak1}+1}$ is time that the network element A receives $M_{Rcv_{Ak1}+1}$, and a processing and maintenance table in next period is entered: M1‖TimestampM1') |

A network element A processes data packets sent by k2 in the same way. The table maintained by network element A caches data for 2 cycles.

TABLE 15

| Table Maintained by Network Element A | |
|---|---|
| Serial Number | Quantity $\bar{t}_m \to \bar{t}_{m+1}$ |
| received packet (k1→A) | $Rcv_{Ak1}$ |
| sent data packet (A→B) | $Sent_A$ |

TABLE 15-continued

Table Maintained by Network Element A

| Serial Number | Quantity $\bar{t}_m \to \bar{t}_{m+1}$ |
|---|---|
| received packet (k2→A) | $Rcv_{Ak2}$ |

Further, for the energy statistics, the statistics on the energy of a received packet and a sent packet is conducted. Here, a Kbit data packet is sent within the distance d, which is represented as ETx(k,d), and the Kbit data packet is received, which is represented as ERx(k,d), and the formula is as follows: the distance between neighboring nodes set herein is within the distance d, so the distance can not be considered in this energy statistics.

TABLE 16

Action of Network Element A (Energy Statistics)

| Serial Number | $T_m \to T_{m+1}$ |
|---|---|
| Energy consumed that a network element A sends a data packet | $EnergySent = J_0 * \sum_{m=1}^{SentA} length_m$ |
| Energy consumed that the network element A receives a data packet of a network element k2 | $EnergyRcv_{Ak2} = J_0 * \sum_{m=1}^{Rcv_{Ak2}} length_m$ |
| Energy consumed that the network element A receives the data packet of a network element k1 | $EnergyRcv_{Ak1} = J_0^* \sum_{m=1}^{Rcv_{Ak1}} length_m$ |
| Energy consumed that the network element A receives all data packets | $EnergyTotalRcv = J_0 * \sum_{m=1}^{Rcv_A} length_m$ |

If the network is invaded, there are two abnormal network elements: one is an attacked network element, and the other is a captured and controlled puppet network element.

There are three attack scenarios:
1) intermediator forwarding attack: the network element loses the packet seriously, and just sends the data packet symbolically;
2) DoS attack: the puppet network element constantly sends the data packet, which consumes the network energy and seriously even causes the network paralysis;
3) Death of ping attack: the puppet network element constantly sends small data packet, which causes the injured network element to have no time to process other data packets;

when the network is not invaded, the network element A receives a minimum of n data packets from each next-level network element in $\bar{t}_m \to \bar{t}_{m+1}$, receives the total energy of the data packets from each next-level network element in $\bar{t}_m \to \bar{t}_{m+1}$, with the minimum of Energymin, and receives the total energy of the data packets from each next-level network element in $\bar{t}_m \to \bar{t}_{m+1}$, with the maximum of Energymax;

it specifies that when the network is not invaded, the minimum forwarding packet rate is $V_{min}$;

supposing that the forwarding rate is $Rate_{forward}$, and $$Rate_{forward} = \frac{EnergySent}{EnergyTotalRcv};$$

1) intermediator forwarding attack: the injured network element loses the packet seriously, and just sends the data packet symbolically;
   (1). if $Rcv_{Ak1}<n$, the network element k1 loses the packet seriously, which is judged as a malicious node;
   (2). if $Rcv_{Ak2}<n$, the network element k2 loses the packet seriously, which is judged as the malicious node;
   (3). if $Rate_{forward}<V$ min, it is judged that the network element A is a malicious intermediator node;
   (4). if $Rate_{forward}>V$ min, the abnormity is not founded in the network;
   the features captured by the network element A are illustrated and specially processed: although the features $Rcv_{Ak1}$ and $Rcv_{Ak2}$ are captured by the network element A, the features are actually the feature attribute of the next-level network element, i.e., k1 and K2;
2) Death of ping attack: the puppet network element constantly sends small data packet, which causes the injured network element to have no time to process other data packets;
3) DoS attack: the puppet network element constantly sends the data packet, which consumes the network energy and seriously even causes the network paralysis;

when $Rcv_{Ak1} \to n$, there are the following conditions:
   (5). Energy min>$EnergyRcv_{Ak1}$, the network element k1 is abnormal, judging that the network element A is under death of ping attack;
   (6). Energy min>$EnergyRcv_{Ak2}$, the network element k2 is abnormal, judging that the network element A is under death of ping attack;
   (7). Energy min<$EnergyRcv_{Ak1}$<Energy max, the abnormity is not founded in the network;
   (8). Energy min<$EnergyRcv_{Ak2}$<Energy max, the abnormity is not founded in the network;
   (9). Energy max>$EnergyRcv_{Ak1}$, the network k1 is abnormal, and the network element i is under DoS attack;
   (10). Energy max>$EnergyRcv_{Ak2}$, the network k2 is abnormal, and the network element A is under DoS attack;
   the features captured by the network element A are illustrated and specially processed: although the features $EnergyRcv_{Ak1}$ and $EnergyRcv_{Ak2}$ are captured by the network element A, the features are actually the feature attribute of the next-level network element, i.e., k1 and K2;

The network element A finally needs to send the information on $Rate_{forward}$, EnergySent, $Rcv_{Ak1}$, $Rcv_{Ak2}$, $EnergyRcv_{Ak1}$, $EnergyRcv_{Ak2}$ and EnergyRcv to the gateway;

These information on $Rcv_{Ak1}$, $Rcv_{Ak2}$, $EnergyRcv_{Ak1}$ and $EnergyRcv_{Ak2}$ are respectively feature data of k1 and k2, and the homogeneous feature data of the network element A is obtained by the statistical calculation of the upper-level network element A of the network element B and recorded as $Rcv_{BA}$;

the establishment of Feature {7,8,9} is completed;

Feature7: $Rcv_{Ak}$, with the weight of $weight_7$;

Feature8: $EnergyRcv_{Ak}$, with the weight of $weight_8$;

Although the features $Rcv_{Ak}$ and $EnergyRcv_{Ak}$ are captured by the network element i, the features are actually the feature attribute of the next-level network element, i.e., k1 and K2;

the above two feature data do not belong to the network element A; and the captured information is added to the feature attributes of k1 and k2;

Feature9: Rate$_{forward}$, with the weight of weight$_9$;
the learning process is summarized as follows:
1) the features are selected as follows:
Feature1:

$$v_{icmp1} = \frac{a}{(\text{Timestamp}_a - \text{Timestamp}_1)},$$

with the weight of weight$_1$;

Feature2: Num$_{topo}$ (the number of topology changes/establishments in a time period), with the weight of weight$_2$;

Feature3: Num$_{sub}$ (the number of sub-network elements calculated by a parent network element), with the weight of weight$_3$;

Feature4: $\Delta$CON=|CON$_{proxy}$=CON$_{IDS}$|, with the weight of weight$_4$;

Feature5: $\Delta$ack=|ack$_{proxy}$−ack$_{IDS}$|, with the weight of weight$_5$;

Feature6:

$$v_{icmp2} = \frac{b}{(\text{Timestamp}_b - \text{Timestamp}_1)},$$

with the weight of weight$_6$;

Feature7: Rcv$_{Ak}$, with the weight of weight$_7$;
Feature8: EnergyRcv$_{Ak}$, with the weight of weight$_8$;
2) Feature9: Rate forward, with the weight of weight$_9$; feature quantification capturing The specific measures for capturing the above 10 features are as follows:

| Data Capturing Mode | Capturing Contents | Objects for Parsing Messages | Extracted Information |
|---|---|---|---|
| intrusion detection auxiliary device 2 | NS message Address unreachable message Address unreachable message | intrusion detection auxiliary device | NS message rate Rate of address unreachable message Rate of address unreachable message |
| Monitoring network element (MN) | DIO of neighbor | After MN is parsed, the MN sends the monitoring list to the intrusion detection auxiliary device 2 | The number of topology changes/establishment in the time period change of the number of the sub-network element calculated by a parent network element item |
| intrusion detection auxiliary devices 1 and 2 | CON messages sent by network elements (FFD and RFD) CON messages forwarded by a proxy network element 6R | intrusion detection device | 1. Rate of CON messages sent by network elements (FFD and RFD) 2. CON messages forwarded by a proxy network element 6R |
| intrusion detection device 1 | 1. an ACK message sent by a gateway 2. the ACK message forwarded by the proxy network element 6R | | 1. Rate of the ACK message sent by a gateway 2. Rate of the ACK message forwarded by the proxy network element 6R |
| network elements (FFD and 6R) | All data packets | The network element sends the extracted information to the gateway in the form of data packet, and then transfers to the console | Rcv$_{Ak}$, EnergyRcv$_{Ak}$ and Rate$_{forward}$ |

3) The following conditions are directly judged to be abnormal:

| Data Capturing Mode | Capturing Contents | Objects for Parsing Messages | Extracted Information | Remarks |
|---|---|---|---|---|
| intrusion Detection Auxiliary Device 1 | RA message of 6R | Console | Address prefix | Being directly judged to be abnormal |
| intrusion Detection Auxiliary Device 1 | RA message of 6R | intrusion detection auxiliary device | RA message rate | |

| Data Capturing Mode | Capturing Contents | Objects for Parsing Messages | Extracted Information | Remarks |
|---|---|---|---|---|
| MN intrusion detection auxiliary devices 1 and 2 | DIO get message of gateway get message forwarded by 6R | MN intrusion detection device | rank-error bit get message rate Forwarded get message rate | Only as the basis for judging 6R |

In addition, judging the behavior of the network not only needs these data with IPV6 features, but also needs to conduct feature filtering on the principal components in a training set of an existing wireless sensor network, so as to select appropriate and important network features. The feature vector space is composed of the above features and the features selected in the training set. This is not the point of the present invention, which will not be repeated herein in detail.

The weights assigned to each feature by the console are multiplied by the corresponding feature data, and the result of adding all the feature data assigned to the weights can effectively reflect the state of the network element.

At this point, the feature data of network elements has been quantitatively analyzed in terms of the features and typical attacks of the 6LoWPAN network, the selection of the features (qualitative analysis on network element state), specific indicators (quantitative analysis on feature data of network elements) of the action execution of the network elements in the network have been completed.

II. Detection Process

The present invention has collected all the data required for intrusion detection above, and the state data table of the network element is formed in the console, and the console is used for intrusion detection.

A key assumption is that normal data points appear in a dense neighborhood, and abnormal data points are far away from a nearest neighbor.

The improvement of feature space, selection of algorithm parameters and a judgment principle of normal profiles and a detection basis will be illustrated in detail below.

1) The present invention proposes constructing a hypercube feature space with continuous fixed size.
2) Global profile forming process: when the feature data of the network elements in the state data table of the network elements are filled, the console calculates a position of a hypercube $C_{ul, \ldots, uq}$ and calculates the frequency of each hypercube position, i.e., the number of the data in the hypercube, thereby forming a global normal profile.
3) after the global normal profile is formed, performing online detection by the console, wherein if the state data of the network elements in the hypercube where the state data of the network elements are located are greater than k, the state of the network element is normal; or the state data of the network element in a detection area being replaced are detected, wherein if the data are greater than k, the state of the network element is normal.

The console positions the state data of the network elements in the hypercube feature space and calculates whether the state data of the network elements fall into the normal profile. The console uses a principle of the method that the hypercube with dense data points is the normal profile. Although this method with fixed boundary sacrifices precision to a certain extent, the resulting reduction in computational complexity is rare.

A detection principle is as follows: supposing that the hypercube is $C_{ul, \ldots, uq}$, a diagonal line of the hypercube is d/2, and h is a coordinate unit. The hypercube is expressed by $$\lfloor u_i \rfloor : u_i = \frac{y_i + c}{h};$$

and after the training data are ready, a structure of the hypercube is fixed. Supposing that $L_1(C_{ul, \ldots, uq})$ is a neighbor of the hypercube $C_{ul, \ldots, uq}$, which can cover a detection area of the state data of any $$d = \sqrt[2]{qh};$$

network elements that falls into the hypercube $C_{ul, \ldots, uq}$, and satisfies the following equation an inspection method for judging the abnormity is:
1) there are at least k data in the hypercube $C_{ul, \ldots, uq}$, and the state data that fall into the hypercube are always normal;
2) there are less than k data in the hypercube $C_{ul, \ldots, uq} \cup L_1(C_{ul, \ldots, uq})$, and the state data in the hypercube are always normal; and
3) if the above two conditions are not satisfied, a DR that can be replaced is found.

Based on a super-grid structure after mobility, the detection are of the state data of any network element can not be accurately inspected, but a geometric DR that replaces the inspection area can be founded. For the state data $y \in C_{ul, \ldots, uq}$ of the network element, the replaceable DR is defined as follows: $J(y) = \{C_{vl, \ldots, vq} | v_i = u_i, u_i + e_i\}$, where $$e_i = \begin{cases} +1, u_i - |u_i| > \frac{1}{2} \\ -1, u_i - |u_i| \leq \frac{1}{2} \end{cases};$$

and the state data of the network element are $y = \{y_l, \ldots, y_q\}$, and mapped on the hypercube.

Two parameters d and k exist in the in the intrusion detection mechanism of the present invention, because the parameters can not be accurately selected without prior knowledge, the parameters are estimated with the known information. The parameter k is usually specified by a user, At this time, k set as 0.01m,m is the number of network elements in the network Through the observation and statistics on the network, the established hypercube structure can be modified to find out the most appropriate d value.

III. Online Updating Process

First, a part of the state data table of the network element is formed in the console. When the state data of the network elements fill in the state data table of the network elements at the console end, the normal profile is formed in the feature space constructed by the console. After the state data table of the network elements are filled for the first time in the $T_0 \rightarrow T_1$ and $T_1 \rightarrow T_2$ time periods, the first round of detection is conducted, as shown in FIG. 5.

The first round of detection is conducted, and at the same time, the state data table of the next round of network elements is continued to be filled. When the state data amount of the network element saved by the console in $T_2 \rightarrow T_3$ reaches i/p, the console randomly selects the state data of the network elements saved in the $T_2 \rightarrow T_3$ time period at the probability p, fills the state data of the selected network elements into the state data table of the network elements, and discards the remaining data. After the state data table of the network elements is completely replaced by new data, the network element sends a request to update the state data table of the network elements, and the normal profile is relearned and updated. The present invention specifies that $T_2 \rightarrow T_3$ is a period for updating the state data table of the network elements. The table is then updated as shown above, with a fixed period.

As shown in FIG. 6, in a wireless sensor network, the communication capability is more constrained than computing capability, so centralized data collection is unrealistic, and the distributed computing is taken into consideration. On this basis, the 6LoWPAN network adopts a distributed mode of real-time operation, which can effectively prolong the network life and improve the network performance.

An operation of the distributed mode requires all sensor nodes to participate in the internal calculation of the network, and the collection of these network features needs the cooperation of each network element in the network, instead of being captured by the intrusion detection auxiliary device.

Thus it can be concluded that in addition to being captured of the auxiliary device, the feature data of IPV6 wireless sensor network also has the cooperation of the network elements in the subnet, therefore, the following points need to be considered for the scheduling of network resources:
1. The monitoring network element (MN) will monitor the communication from the neighbors thereof (comprising parent network element and sub-network element).
2. The network element is actively detected, that is, the network element sends the NS message in reverse (passing through a temporarily applied GTS time slot).
3. Finally, the network element A simply sends the $Rate_{forward}$, EnergySent, $Rcv_{Ak}$, $EnergyRcv_{Ak}$ and EnergyTotalRcv information to the gateway.
4. A detection module of each network element performs the local normal profile detection, and finally uploads an abstract to a cluster-head network element.
5. The cluster-head network element also needs to send the global normal profile to each network element.6

Each proxy network element RFD detects the CON/get/ACK message rate.

In addition, the above 6 points that need to be considered occur in parallel, and the tasks of some network elements are multiple, therefore, the above 6 points need to be considered simultaneously in time slot allocation, so that the communication resources can be reasonably configured.

The present invention has the following beneficial effects:
1. The present invention designs an intrusion detection mechanism based on an improved KNN algorithm for an IPV6 wireless sensor network, taking 6LoWPAN, RPL and CoAP protocols as core standards;
2. The present invention specifies a method of data capturing for the features of a network with an IPV6 wireless sensor by an intrusion detection auxiliary device and network elements;
3. The present invention selects and analyzes the state features in the network for the 6 LoWPAN network, comprising the changes of network element state caused by DoS attacks introduced when neighbors discover security vulnerability, routing selection attack introduced by a RPL, rank attack and local repair attack, introduced specific attack of CoAP in a subscription model, as well as common replay attack and intermediator forwarding attack in the network;
4. The present invention forms the extracted data after the features of the network elements are trained into a state data table of the network elements, and preprocesses the data in the table to realize the profile fixing of the feature space during the detection process, wherein, the present invention assigns the weights to the features and transfers zero points, to alleviate the bias caused by large and small influence factors (refers to the numerical value after feature quantization) and realizes simplified calculation;
5. The present invention establishes the feature space through the state data table of the network elements, and in order to reduce the calculation complexity, establishes the feature space of a super network structure composed of hypercube with continuous fixed size, forms a normal profile of the state data of the network elements, and illustrates a basis that explains the determination of anomalies in the feature space;
6. The present invention periodically updates the state data of the network elements in the list in a manner of selecting data by means of fixed probability, so as to realize the self-updating of the normal profile of the state data of the network elements.

DESCRIPTION OF DRAWINGS

To enable the purpose, the technical solution and the beneficial effects of the present invention to be more clear, the present invention provides the following drawings for explanation.

DETAILED DESCRIPTION

Preferred embodiments of the present invention will be described below in detail in combination with drawings.

The embodiment mainly illustrates the process of intrusion detection after 6LoWPAN heterogeneous network attack, describes a logical process of intrusion detection, and illustrates the effect after detection.

Figure 1:
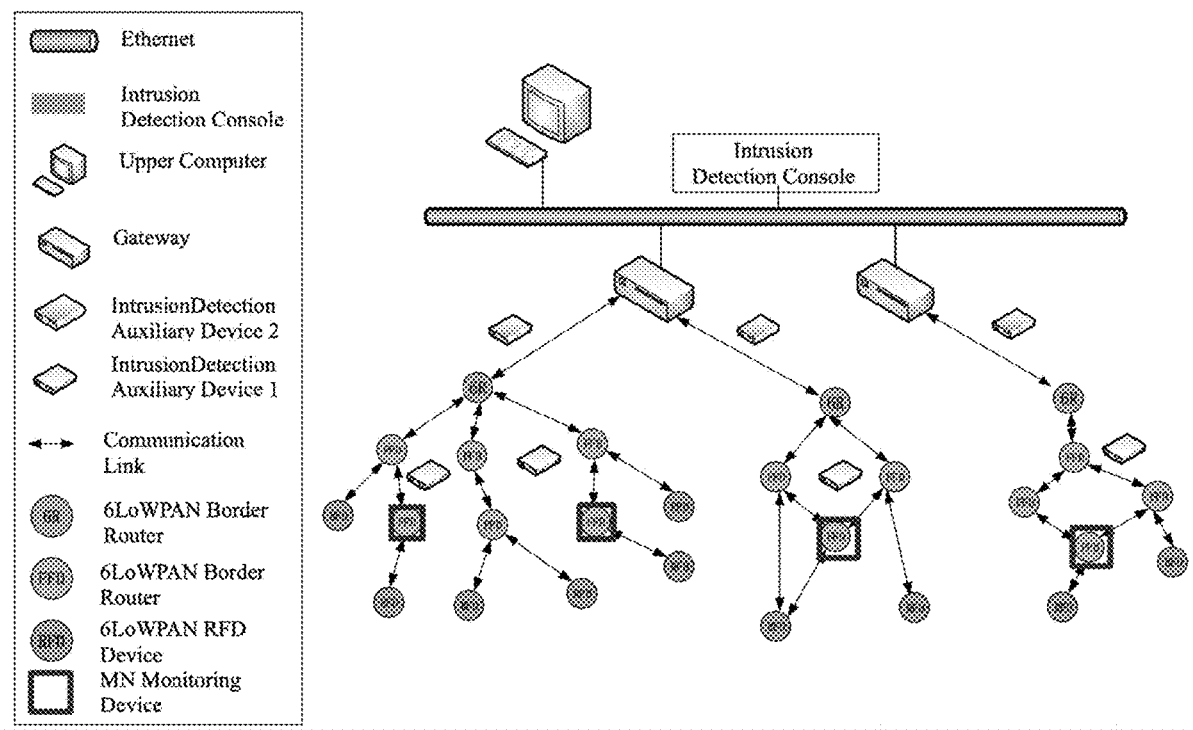
FIG. 1 is an intrusion detection architecture of a 6LoWPAN network.
Figure 2:
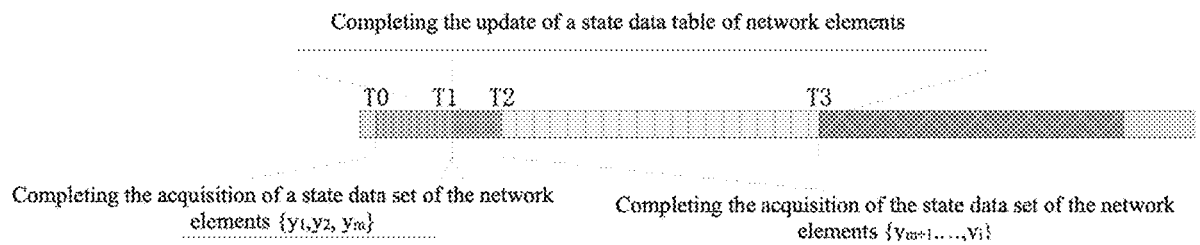
FIG. 2 is a sequence diagram of data capturing.
Figure 3:
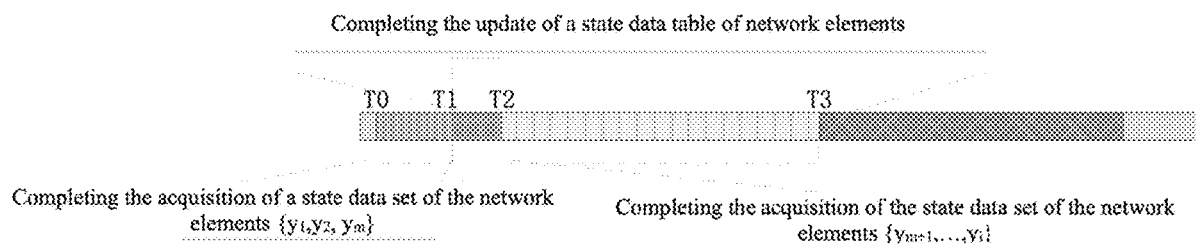
FIG. 3 is an action in T0 to T1.
Figure 4:
FIG. 4 shows that (a) is an action in T0 to T1; and (b) is an action in T2 to T3.
Figure 4:
Figure 5:
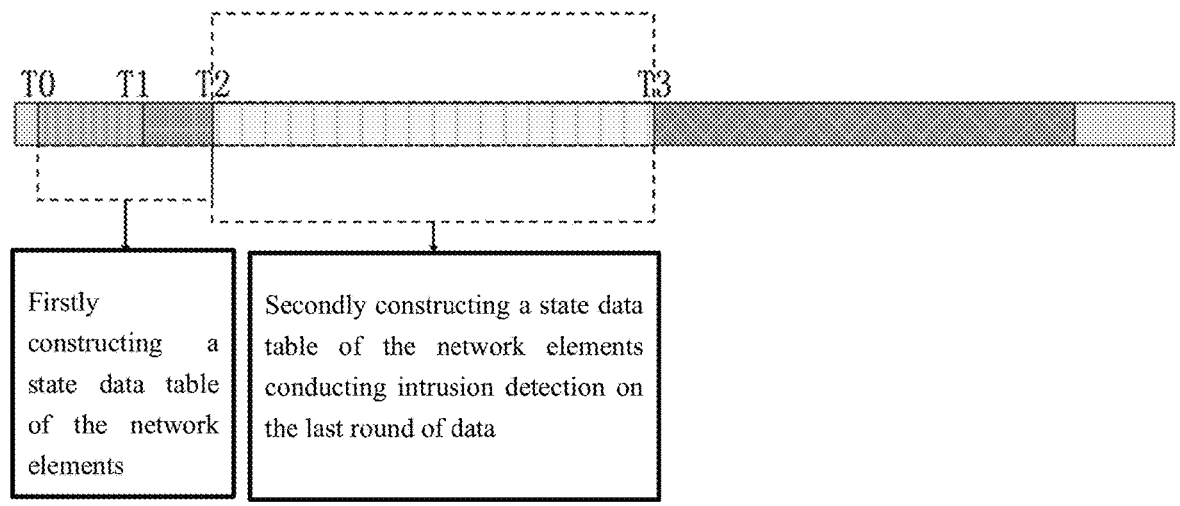
FIG. 5 is the occurrence time for first detection.
Figure 6:
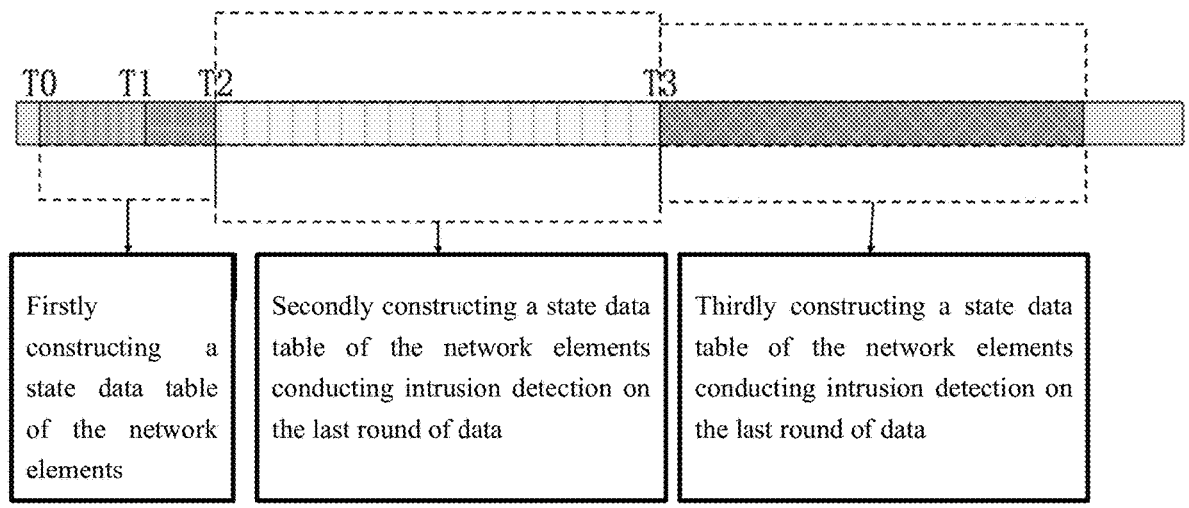
FIG. 6 is a sequence diagram of an intrusion detection process.
Figure 7:
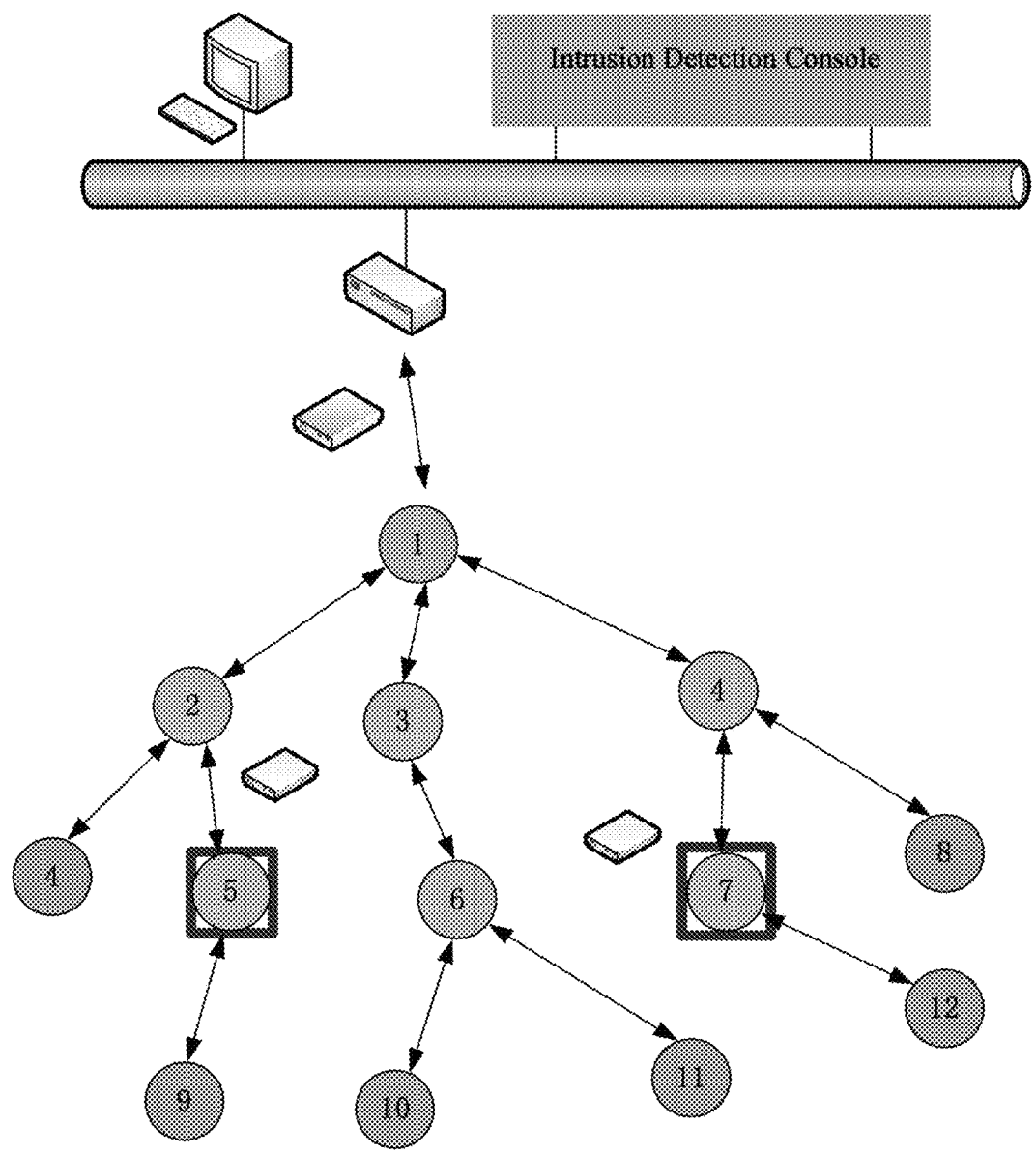
FIG. 7 is a 6LoWPAN heterogeneous network in an embodiment.

A 6LoWPAN heterogeneous network in an embodiment is shown in FIG. 7 below:

The role description has been illustrated in FIG. 1 of the present invention.

Simulated attack implementation:

The attack is an attack against the 6LoWPAN network, so an attacker needs to attack within the wireless coverage range (within 30 meters) of a vulnerable network element.

The 6LoWPAN is a wireless communication specification constructed based on IEEE 802.15.4, which allows the forwarding of the IPV6 packet through low-power Personal Area Networks (PAN).

In order to monitor and inject 6LoWPAN traffic, a peripheral device based on an IEEE 802.15.4 specification is needed. The device is installed with an ATMEL AVR Raven of a Contiki 6LoWPAN firmware image, and provides a standard network interface, which can monitor and inject the network traffic into the 6LoWPAN network. The network traffic is monitored and injected into the 6LoWPAN network through the network interface.

Through an incoming process of a new node and by monitoring the data packet captured from the 6LoWPAN network simultaneously, the network protocol thereof is parsed, and the message is constructed, to control the network element and send any data packet.

Embodiment

Attack results: Suppose the node 10 implemented by attacking is captured. That is, the node 10 is a puppet network element.

Intrusion detection implementation:

1) Constructing a state data table of the network elements;

There are nodes in the network, with the total of 12 network elements. wherein, a 6R network element exists.

Therefore, the state data amount of network elements is 20.

The network starts running, each network element captures the data in $T_0 \to T_1$, and $T_1 \to T_2$, and the state data table of the network elements is firstly formed on the console.

The algorithm to firstly form the state data table of network elements is as follows:

---
Algorithm(1): Produce-ST(state table)
---
Input: featuredata    // feature data
Output: mote state // state set of network elements, i.e., state data table of network elements
Do:
1: ST produce-ST
2:if T0<t<T2
else Update-ST
3: for i=1,...20
4: for q=1,...10
5:
6:the data is suffered in ST
7: return
8: motestate = ST
9: End

---

2) Detection process: constructing feature space, and establishing normal contour.

---
Algorithm(2): Detection
---
Input: $y_i$,k,c,h // state data of network elements, and detection algorithm parameters
Output: label // detection results
Do:
1:    label = detection
2:    mote state $y_i$ arrives in
3:    for i = 1 . . . 20

---
Algorithm(2): Detection
---
4:    $u_i = \dfrac{y_i + c}{h}, pos = \lfloor u_i \rfloor$ 5:    Index = find-index(ST, pos)
6:    if ST[index] · count ≥ label = normal; return
7:    for i =1 . . . 20
8:    if $u_i - |u_i| > \dfrac{1}{2}$  $e_i = 1$, else $e_i = -1$ 9:    count = 0
10:   for $v_1 = u_1, u_1 + e_1, \ldots, v_{19} = u_{19}, u_{19} + e_{19}$
11:   $v_{20} = u_{20}$, pos = 0
12:   for i = 1, . . . 20
13:   pos = $\lfloor v_i \rfloor$
14:   count = ST(pos) · count + ST(pos + $e_{20}$) · count
15:   if count < k label = anomaly,else label = normal
16:   End

---

Intrusion detection results:

See parameter k=1/12*20≈2

In the process of intrusion detection, the data points in a hypercube where node 10 is located are less than K, so the node 10 is judged to be abnormal.

3) Updating process

---
Algorithm(3): Update-ST(state table)
---
Input: P,feature data     // probability, and feature data
Output: mote state // state set of network elements, i.e., state data table of network elements
Do:
1: ST Update-ST
2:assume p=1/3
3:if t>T2
4:for i=1,...60
5:for q=1,...10
6:
7:the data is suffered in ST
8: return
9: motestate = randomlyselect20datainST
10: End

---

Finally, it should be noted that the above preferred embodiments are only used for describing, rather than limiting the technical solution of the present invention. Although the present invention is already described in detail through the above preferred embodiments, those skilled in the art shall understand that various changes in form and detail can be made to the present invention without departing from the scope defined by claims of the present invention.

The invention claimed is:

1. An improved KNN (K-Nearest Neighbor)—based 6LoWPAN (IPv6 over Low-power Wireless Personal Area Networks) network intrusion detection method, characterized in that: comprises following steps:

S1: learning process:

establishing a state data table of network elements, and completing networking by nodes, wherein there are m network elements in a network; setting a state data set of a plurality of network elements cached in a table as $\{y_1, \ldots, y_i\}$, selecting q features of network elements of a 6LoWPAN network, and recording constructed feature set of the network elements as {Feature1, Feature2, Feature q};

reflecting state data of a certain network element x through the q features of network elements, and recording as $y_x=\{y_{x1}, \ldots, y_{xq}\}$, wherein number of features of different network elements is q; and after a network starts operating, recording all feature data of network elements by a console; and selecting and capturing the feature data of network elements;

S2: detecting process: collecting all data needed for intrusion detection, forming a state data table of network elements on the console, and conducting intrusion detection by the console; and supposing that normal data points appear in a dense neighborhood, making abnormal data points be far away from a nearest neighbor; and S3: on-line updating, characterized in that: a judge process for the intrusion detection comprises: direct judgment based on features of a certain network element and comprehensive judgment on a state data table of network elements established based on features of several network elements, characterized in that: the comprehensive judgment on the state data table of network elements established based on the features of several network elements is: in process of collecting the features of network elements, an intrusion detection system collects multiple quantifiable security features that can reflect self-security states of network elements of a 6LoWPAN network, establishes a state data table of network elements, and comprehensively judges whether intrusion exists in the network, characterized in that: the comprehensive judgment on a state data table of network elements established based on features of several network elements is specifically:

selecting state data amount of network elements, thus determining a number of samples in the state data table of network elements, i.e., number of rows;

constructing a feature set of network elements, thus determining the features related to 6LoWPAN intrusion detection in the state data table of network elements, and determining a dimension of the data, i.e., the number of columns;

filling the state data table of network elements; and conducting data preprocessing and completing orthogonal normalization processing;

a specific construction is as follows:

(1) selection of the state data amount of network elements the number of sample state data in the state data table of network elements shall not be less than the number of network elements in the network, nor more than two times the total number of network elements, that is, the number of samples that can find outliers is optimal;

the state set of a plurality of network elements cached in the table is set as $\{y_1, \ldots, y_i\}$;

$m<i<2m$ is specified; three time periods of $T_0 \rightarrow T_1$, $T_1 \rightarrow T_2$ and $T_2 \rightarrow T_3$ are specified; before $T_0$, the network has started and a node joining process is completed; before $T_0$, the network has started and the node joining process is completed; an acquisition for the state data set $\{y_1, \ldots, y_m\}$ of network elements is completed in $T_0 \rightarrow T_1$; the acquisition for the state data set $\{y_{m+1}, \ldots, y_i\}$ of network elements is completed in $T_1 \rightarrow T_2$; an update for the state data table of network elements is completed in $T_2 \rightarrow T_3$ (that is, a previous cache is cleared and new data are reloaded); and at this time, a state set of a plurality of network elements cached in the table is $$\left\{y_1, y_2, \ldots, y_{\frac{i}{p_i}}\right\},$$

and p is score probability;

two time periods of $T_0 \rightarrow T_1$, and $T_1 \rightarrow T_2$ will pass only when the state data table of network elements is firstly formed, and then a forming process in the table will follow a mode of a $T_2 \rightarrow T_3$ time period;

in the firstly formed state data table of network elements, states $y_{m+x}$ and $y_x$ are the states of the same network element in different time periods;

in addition, in the $T_2 \rightarrow T_3$ time period, the state of network elements in the network needs to be captured in $$\left\lfloor \frac{i}{p \times m} \right\rfloor$$

time periods; and $\lfloor x \rfloor$ is a function representation for an integer part of a decimal;

the parameter p is used during an updating process and is a parameter in an updating algorithm, and a value of p is specified by the console;

at this time, states $y_{(m-1)+x}$, $y_{2(m-1)+x}$, ..., $$y_{(\frac{2}{p}-1)(m-1)+x}$$

and $y_x$ are the states of the same network element in different time periods, and the data in the table are updated after these state data are screened according to the probability of p;

the states of network elements in the table have been converted into the data, the console does not need to reflect time when the table is constructed, and previous states of the network elements do not need to be replaced; and the data amount of the states of network elements will be determined;

(2) construction of feature set of network elements some features are time-based statistical features of network traffic, i.e., $$\frac{\text{the number of feature messages}}{\text{time period}};$$

and in order to avoid an influence of time period on statistical feature data, these features are uniformly represented by the "occurrence frequency of messages";

the features are as follows:

Feature1: occurrence frequency of address unreachable response messages, with the weight of $weight_1$;

Feature2: the number of topology changes/establishments in a time period, with the weight of $weight_2$;

Feature3: the number of sub-network elements calculated by a parent network element item, with the weight of $weight_3$;

Feature4: differences that a proxy network element and an intrusion detection auxiliary device 1 detect a CON (confirm) message, with the weight of $weight_4$;

Feature5: differences that the proxy network element and the intrusion detection auxiliary device 1 detect an ACK (acknowledge) message, with the weight of $weight_5$;

Feature6: occurrence frequency of response messages when a message is overlarge, with the weight of $weight_6$;

Feature7: the number of certain sub-network element data packets received, with the weight of $weight_7$;

Feature8: consumed energy of a certain sub-network element data packet received, with the weight of $weight_8$;

Feature9: forwarding rate of network element data packet, with the weight of $weight_9$; the weights are assigned according to an impact factor console of each feature, satisfying $\Sigma weight=1$; and the assigned weights can reduce a bias caused by distinct features; and in this table, a process that a series of features of network elements are constructed as a feature set is:

since the state data of network elements in the table are captured at different times in the process of firstly forming the state data table of network elements, cases of capturing data in the $T_0 \to T_1$ and $T_1 \to T_2$ time periods will be explained in the process of constructing the following feature set; and except that the cases of capturing the data in different time periods exist in the process of firstly forming the table, the other cases are that the data are captured in a $T_2 \to T_3$ time period;

a process of constructing the state data table of network elements in time sequence is that:

firstly, describing a first forming process of the state data table of network elements:

in a $T_0 \to T_1$ time period,

1) Network element feature Feature1 capturing, by an intrusion detection auxiliary device 2, an address unreachable message that the network element sends to an upper-level network element, conducting statistical monitoring on the address unreachable message in $T_0 \to T_1$, monitoring the occurrence frequency, and recording a feature as $v_{icmp1}$; and recording the network element feature of $v_{icmp1}$ in the table;

2) Network element features Feature2 and Feature3 a MN (monitoring network element) in $T_0 \to T_1$ time period: detecting any change related to a preferred parent network element in a network element DIO (DODAG information object) message of the network, taking DODAG ID (Destination-Oriented Directed Acyclic Graph Identification) changes or levels of the network element to be an infinitive, and recording the feature as $Num_{topo}$;

the monitoring network element MN in $T_0 \to T_1$ time period: detecting the increment of statistical sub-network elements through the parent network element; recording the feature as $Num_{sub}$; recording the features of $Num_{topo}$ and $Num_{sub}$ in the table;

3) Network element feature Feature4 an intrusion detection auxiliary device 1 and a proxy network element in $T_0 \to T_1$ time period: conducting statistics on network element notification messages; comparing the difference between the notification messages obtained by both; and monitoring the difference number of the messages and recording the feature as $\Delta CON$;

4) Network element feature Feature5 the intrusion detection auxiliary device 1 in $T_0 \to T_1$, time period: conducting statistics on the rate at which the gateway returns an ACK message; the proxy network element 6R in $T_0 \to T_1$: conducting statistics on the ACK message rate; comparing the difference between the ACK messages obtained by both; and monitoring the difference number of the messages and recording the feature as $\Delta ack$; and recording the feature of $\Delta ack$ in the table;

5) network element feature Feature6 an intrusion detection auxiliary device 2 in $T_0 \to T_1$ time period: capturing an error report message returned to the network element, and conducting statistic detection on the message; monitoring the frequency of occurrence and recording the feature as $v_{icmp2}$; and recording the feature of $v_{icmp2}$ in the table;

6) Network element energy feature

FFD (full function device) and 6R in $T_0 \to T_1$ time period: conducting statistics on self-energy, and processing the message obtained through the statistics, to obtain an energy feature, comprising the number $Rcv_{Ak}$ of data packets received by network elements, the consumed energy $EnergyRcv_{Ak}$ of the data packets received by the network elements, and forwarding rate $Rate_{forward}$ of a network element data packet;

after the completion of a construction for the state data table of the network elements, a processing mode of the console for specific feature data of network elements in the state data table of network elements will be specially illustrated;

(3) data preprocessing after the state data table of network elements is filled

1) Denoising process:

the console checks whether there are some non-numerical variables and obviously unreasonable data in the state data table of network elements, which are invalid; and after the denoising process is completed, the feature data set of network elements of the nth feature in the table is set as $y_{1n}=\{y_{1n}, y_{2n}, \ldots, y_{in}\}$, i.e., the nth column of the state data table of network elements, and, threshold values of the $y_{1n}$ set are $max_n$ and $min_n$, where $min_n$ is a minimum value in the set and $max_n$ is a maximum value; and at this time, the console needs to pre-process a threshold range of each feature, and the console converts the threshold range $(min_i, max_i)$ of each feature to that between $(0,1)$ through normalization function processing, that is, an eigenvalue is converted to $$\frac{y_{in}}{|max_n - min_n|};$$

and in addition, the console also needs to rematch the weight of each feature according to the impact factor of the feature;

2) The console constructs q dimensional coordinate space, and takes q=10, and the feature data of the network elements in the state data table of network elements need to be located in a coordinate space; and at this time, the console introduces an echo coefficient c to transfer zero, so that the entire feature space is moved to a positive coordinate space, where the coefficient c is set to:

$$c > |min|, min = min\{min_i, i=1, 2, \ldots, q\}.$$

2. The improved KNN-based 6LoWPAN network intrusion detection method according to claim 1, characterized in that: an analysis mode, a selection mode, a capturing mode and an abnormal judgment and decision mode of multiple quantifiable security features that can reflect a self-security state of the 6LoWPAN network element are as follows:

process 1: Address assignment and resolution
connecting a gateway and a 6R to a network, and fixedly assigning an address; then, after network elements FFD and RFD (reduced-function device) are connected to the network, sending a request information RS (Router Solicitation) message to directly connect the 6R to request an IPV6 address, and after the 6R receives the RS message, replying a RA (Router Advertisement) message, wherein the RA is used for configuring an address prefix, the network elements use the prefix to configure an IP (Internet Protocol) address, and the parameters for configuring the network comprise an MTU(maximum transmission unit), a hop limit, and a life value TTL (Time to Live); obtaining the IP addresses for the RFD and the FFD; converting MAC (Media Access Control) addresses owned by the RFD and the FFD to an interface ID through an EUI-64 (64-Bit IP Version 6 interface identifier), and adding a link prefix;
in the above process, the selection and capturing modes of the network element features are specifically as follows:
1) Occurrence frequency of address unreachable response messages
capturing, by the intrusion detection auxiliary device 2, an address unreachable message returned to a network element, and detecting a message rate; and once the rate exceeds a threshold, indicating that a destination address does not exist in the network, or a malicious use exists;
filtering and extracting ICMP (Internet Control Message Protocol) messages in $T_0 \rightarrow T_1$, $T_1 \rightarrow T_2$ and $T_2 \rightarrow T_3$ by the intrusion detection auxiliary device 2;
supposing that $\bar{t}_m$ (m=0,1,2) is the starting time and $\bar{t}_{m+1}$ is the end time, and $\bar{t}_m \rightarrow \bar{t}_{m+1}$ is a fixed time period, which is a time window;
a is a certain network element in $\bar{t}_m \rightarrow \hat{t}_{m+1}$, i.e., the number of ICMP error response messages received by FFD and 6R, $Timestamp_1$ represents a certain network element in $\bar{t}_m \rightarrow \bar{t}_{m+1}$, i.e., a timestamp of the 1st error response message received by the FFD and the 6R, and $Timestamp_a$ represents a timestamp of the a th error response message received in $\bar{t}_m \rightarrow \bar{t}_{m+1}$; and $Timestamp_x$ represents the time of the x th message received in $\bar{t}_m \rightarrow \bar{t}_{m+1}$;

$$v_{icmp1} = \frac{a}{(Timestamp_a - Timestamp_1)}$$

is the occurrence frequency of the ICMP error response messages received by the network element in $\bar{t}_m \rightarrow \bar{t}_{m+1}$;
if the network is normal and not invaded, the maximum frequency of the received error response message is $V'_{max}$;

$$\text{if } v_{icmp1} = \frac{a}{(Timestamp_a - Timestamp_1)} > V'_{max}, \quad (1)$$

the intrusion detection device 2 determines that the network element is injured; and $$\text{if } v_{icmp1} = \frac{a}{(Timestamp_a - Timestamp_1)} \leq V'_{max}, \quad (2)$$

the network element is normal;
for Feature1, above features are established in this step: frequency of address unreachable message, and the weight is set as $weight_1$;
process 2: establishment of network routing
an intrusion detection mechanism performs following steps of:
capturing, analyzing and extracting an established routing control message in accordance with RFC6550 by monitoring the network element, wherein the information on an MN monitoring list comes from DIO and DAO (Destination Advertisement Object) messages identifying network elements;
MN monitoring list:
i. a network element ID and a rank thereof
ii. a preferred parent network element ID of the network element and the rank thereof
iii. the number of topology changes/establishments of the network element in a time period
iv. an ETX (expected number of transmissions) value of a network element, which is obtained from a DIO message broadcast by the network element
v. change of a network element as a parent network element, which comes from DAO messages of other network elements
vi. the number of sub-network elements calculated by a parent network element item;
it is required that the sent and received network elements along a route are obliged to check whether a rank rule is broken, and a rank-error bit is set in RPL (Routing Protocol for Low-Power and Lossy Networks) packet information, to ensure that a rank value cannot be faked;
in the above processes, an execution step of which a network element in the network and an intrusion detection auxiliary device capture feature data are as follows:
each monitoring network element is responsible for monitoring features of a network element object within a monitoring scope thereof in the time periods of $T_0 \rightarrow T_1$, $T_1 \rightarrow T_2$ and $T_2 \rightarrow T_3$, and when the monitoring network element hears the DIO message from the network element object for the first time, it illustrates that a topology starts setting and the state changes; and then, the monitoring network element extracts all necessary information (i.e., a monitoring list) in specific entries of the objects in a monitoring table thereof from the DIO and DAO messages, to determine control messages sent or received by monitored network element objects;
in the above processes, the network element features are selected specifically as:
2) The number of DODAG ID changes (the number of topology changes/establishments in a time period)
if MN detects any change related to a preferred parent network element in the DIO message, that is, the DODAG ID changes or level of the network element becomes an infinitive, and a state change is recorded; and if the state changes frequently and the number of changes exceeds the threshold, any network element behavior that results in a local repair will be recorded in the monitoring network element; and the network element that results in the local repair is abnormal;
for Feature2, the above features are established in this step: the number of topology changes/establishments in a time period (i.e., the number of changes), and the weight is set as $weight_2$;

3) The number of sub-network elements calculated by a parent network element item
  when MN detects that an ETX relationship between a parent network element and a sub-network element in a monitoring list is broken, that is, an ETX value of the parent network element is large and a route is invalid, and at this time, RPL starts a local repair mechanism to restore a network routing topology; and if the number of the sub-network elements calculated by the parent network element item increases beyond the threshold value, the threshold value depends on a fluctuation of a network environment and a network size, that is, when the network element broadcasts, the ETX value thereof decreases and at the same time the increase of sub-network element thereof exceeds the threshold value, showing that the sub-network element is invaded; and the network element is necessarily abnormal;
  thus, two features such as the ETX value of the network element and the increment number of the sub-network elements are known to jointly judge the security state of the network element; and the increment number of the sub-network elements is the quantity of state, which cannot be recorded in the state data table of network elements, therefore, "the number of the sub-network elements calculated by the parent network element item" is recorded in the state data table of network elements, and the ETX value of the network element cooperates with this feature of "the number of the sub-network elements calculated by the parent network element item", and when the ETX value of the network element decreases, this feature of "the number of the sub-network elements calculated by the parent network element item" is recorded; and if the ETX value of the network element does not decrease, this feature has no influence, and both the eigenvalue and the weight thereof are set to 0; and
a feature of the number of the sub-network elements calculated by the parent network element item is taken as a factor, and the weight is set as Feature3;
process 3: acquisition of network resource state
An application layer of a network architecture adopts a CoAP (Constraint Application Protocol) protocol subscriber pattern to collect information, and execution action steps of each unit in the network and an execution step of which a network element in a network and the intrusion detection auxiliary device 1 capture feature data are as follows:
when the data changes, sending a notification to a client as a request response by a network element to which each proxy client subscribes, wherein the notification is a CON message; and capturing the CON message sent to 6R and calculating the notification rate from each network element statistically by the intrusion detection auxiliary device 1;
4) Differences that a proxy network element and an intrusion detection auxiliary device 1 detect a CON message
each proxy network element, that is, does not collect the information, and network elements for only forwarding need to statistically monitor the number of the CON messages from different network elements in $T_0 \rightarrow T_1$, $T_1 \rightarrow T_2$ and $T_2 \rightarrow T_3$;
once a certain network element is detected to send notifications too frequently, exceeding the threshold value, it illustrates that the network is abnormal, and at this time, it is impossible to determine whether the proxy network element is abnormal or a network element (i.e., a server) in a sub-network is abnormal, therefore, the statistical information by the intrusion detection auxiliary device 1 and the proxy network element is compared,
$CON_{proxy}$ is an occurrence frequency of CON messages captured by the proxy network element;
$CON_{IDS}$ is the occurrence frequency of CON messages captured by the intrusion detection auxiliary device;
Supposing that $\Delta CON=|CON_{proxy}-CON_{IDS}|$
if $\Delta CON$ is overlarge,
the console further compares $CON_{proxy}-CON_{IDS}$
if $CON_{proxy}-CON_{IDS}>0$, the proxy network element is abnormal; and
if $CON_{proxy}-CON_{IDS}<0$, the server is abnormal;
the notification is the CON message, 6R and the proxy network element need ACK to respond to the CON message, and if the ACK response is not received for a long time, the client will automatically cancel the subscription to the server network element;
5) Differences that a proxy network element and an intrusion detection device detect an ACK message
the intrusion detection auxiliary device 1 needs to statistically monitor the occurrence frequency at which the gateway returns the ACK message in $T_0 \rightarrow T_1$, $T_1 \rightarrow T_2$ and $T_2 \rightarrow T_3$; and the proxy also needs to statistically monitor the occurrence frequency of the ACK message in $T_0 \rightarrow T_1$, $T_1 \rightarrow T_2$ and $T_2 \rightarrow T_3$;
if an occurrence frequency of ACK messages is significantly lower than that of CON messages, it illustrates that the gateway or the proxy network element is abnormal; at this time, the occurrence frequency of statistical ACK messages by the gateway and the proxy network element is compared to further judge the abnormity; and the judgment for the CON message is similar,
$ack_{proxy}$ is an occurrence frequency of CON messages captured by the proxy network element;
$ack_{IDS}$ is the occurrence frequency of CON messages captured by the intrusion detection auxiliary device 1;
in the above features, the occurrence frequencies of ACK messages captured respectively by the proxy network element and the intrusion detection auxiliary device are related;
  the establishments of Feature4 and Feature5 are completed;
  Feature4: $\Delta CON=|CON_{proxy}-CON_{IDS}|$, with the weight of $weight_4$;
  Feature5: $\Delta ack=|ack_{proxy}-ack_{IDS}|$, with the weight of $weight_5$;
6) Occurrence frequency of response messages when a message is overlarge
during a data packet uploading process, if a data packet exceeds a current network element MTU, the data packet will be discarded and an ICMP error report message will be returned;
an intrusion detection auxiliary device 2 filters and extracts ICMP messages in $T_0 \rightarrow T_1$, $T_1 \rightarrow T_2$ and $T_2 \rightarrow T_3$;
supposing that $\bar{t}_m$ (m=0, 1, 2) is the starting time and $\bar{t}_{m+1}$ is the end time, and $\bar{t}_m \rightarrow \bar{t}_{m+1}$ is a fixed time period, which is a time window;
b is the number of ICMP error response message received in $\bar{t}_m \rightarrow \bar{t}_{m+1}$, $Timestamp_1$. represents a timestamp of the 1st error response message received in $\bar{t}_m \rightarrow \bar{t}_{m+1}$, and Timestamp$_{b'}$ represents a timestamp of the bth error response message received in $\bar{t}_m \to \bar{t}_{m+1}$; and Timestamp$_{x'}$ is the time of xth message received in $\bar{t}_m \to \bar{t}_{m+1}$;

$$v_{icmp2} = \frac{b}{(\text{Timestamp}_{b'} - \text{Timestamp}_{1'})}$$

is the occurrence frequency of the error response message received by the injured network element in $\bar{t}_m \to \bar{t}_{m+1}$;

if the network is normal and not invaded, the maximum frequency of the received error response message is $V_{max}$ $$\text{if } v_{icmp2} = \frac{b}{(\text{Timestamp}_{b'} - \text{Timestamp}_{1'})} > V_{max}, \quad (3)$$

the network element is injured; and $$\text{if } v_{icmp2} = \frac{b}{(\text{Timestamp}_{b'} - \text{Timestamp}_{1'})} \leq V_{max}, \quad (4)$$

the network element is normal;
the establishment of Feature6 is completed;

$$v_{icmp2} = \frac{b}{(\text{Timestamp}_{b'} - \text{Timestamp}_{1'})}, \quad \text{Feature 6}$$

with the weight of weight$_6$;

7) Energy feature in addition, during a normal operation of the network, an FFD and a 6R need to conduct energy statistics. The specific measures are as follows:

the FFD and the 6R store neighbor information in a routing registry; and a neighbor table and DODAG are as follows:

four network elements k1, k2, A, B are supposed k1, k2 forwards data to A, and A forwards the data to B;

Supposing that Rcv$_{Ak1}$ is the number of data packets that A receives k1, Rcv$_{Ak2}$ is the number of the data packets that A receives k2, Rcv$_{Ak}$ is the number of the data packets that A receives all next-level network elements k1 and k2, and Sent$_A$ is the number of the data packets that A forwards to an upper-level network element B;

a network element i needs to attach a timestamp to the data packets received and sent thereby, so as to conduct periodic energy statistics, and a statistical energy is used as key security information on abnormal detection;

for the energy statistics, the statistics on the energy of a received packet and a sent packet is conducted;

a Kbit data packet is sent within a distance d, which is represented as ETx(k,d), and the Kbit data packet is received, which is represented as ERx(k,d), and a distance between neighboring nodes is set within the distance d;

if the network is invaded, there are two abnormal network elements: one is an attacked network element, and the other is a captured and controlled puppet network element;

there are three attack scenarios:

1) Intermediator forwarding attack: the network element loses the packet seriously, and just sends the data packet symbolically;
2) DoS attack: the puppet network element constantly sends the data packet, which consumes the network energy and seriously even causes the network paralysis;
3) Death of ping attack: the puppet network element constantly sends small data packet, which causes the injured network element to have no time to process other data packets;

when the network is not invaded, the network element A receives a minimum of n data packets from each next-level network element in $\bar{t}_m \to \bar{t}_{m+1}$, receives the total energy of the data packets from each next-level network element in $\bar{t}_m \to \bar{t}_{m+1}$, with the minimum of Energymin, and receives the total energy of the data packets from each next-level network element in $\bar{t}_m \to \bar{t}_{m+1}$, with the maximum of Energymax;

it specifies that when the network is not invaded, a minimum rate of a forwarded packet is $V_{min}$;

supposing that the forwarding rate is Rate forward, and $$\text{Rate}_{forward} = \frac{EnergySent}{EnergyTotalRcv};$$

1) Intermediator forwarding attack
(1). if Rcv$_{Ak1}$<n, a network element k1 loses the packet seriously, which is judged as a malicious node;
(2). if Rcv$_{Ak2}$<n, a network element k2 loses the packet seriously, which is judged as the malicious node;
(3). if Rate$_{forward}$<V min, it is judged that a network element A is a malicious intermediator node;
(4). if Rate$_{forward}$>V min, an abnormity is not founded in the network;

the features captured by the network element i are illustrated and specially processed: although the features Rcv$_{Ak1}$ and Rcv$_{Ak2}$ are captured by the network element A, the features are actually the feature attributes of next-level network elements, i.e., k1 and k2;

2) Death of ping attack
3) DoS attack
when Rcv$_{Ak1}$>n, there are following conditions:
(5) Energy min>EnergyRcv$_{Ak1}$, the network element k1 is abnormal, judging that the network element A is under death of ping attack;
(6) Energy min>EnergyRcv$_{Ak2}$, the network element k2 is abnormal, judging that the network element A is under death of ping attack;
(7) Energy min<EnergyRcv$_{Ak1}$<Energy max, the abnormity is not founded in the network;
(8) Energy min<EnergyRcv$_{Ak2}$<Energy max, the abnormity is not founded in the network;
(9) Energy max>EnergyRcv$_{Ak1}$, the network k1 is abnormal, and the network element A is under DoS attack; and
(10) Energy max>EnergyRcv$_{Ak2}$, the network k2 is abnormal, and the network element A is under DoS attack;

features captured by the network element A are illustrated and specially processed: although the features EnergyRcv$_{Ak1}$ and EnergyRcv$_{Ak2}$ are captured by the network element A, the features are actually the feature attributes of the next-level network elements, i.e., k1 and k2;

a network element A finally needs to send the information on Rate$_{forward}$, EnergySent, Rcv$_{Ak1}$, Rcv$_{Ak2}$, EnergyRcv$_{Ak1}$, EnergyRcv$_{Ak2}$ and EnergyRcv to the gateway;

these information on Rcv$_{Ak1}$, Rcv$_{Ak2}$, EnergyRcv$_{Ak1}$ and EnergyRcv$_{Ak2}$ are respectively feature data of k1 and k2, and homogeneous feature data of the network element A is statistically calculated by the upper-level network element B of the network element A and recorded as Rcv$_{BA}$;

the establishment of Feature {7,8,9} is completed;

Feature7: Rcv$_{Ak}$, with the weight of weight$_7$;

Feature8: EnergyRcv$_{Ak}$, with the weight of weight$_8$;

although the features Rcv$_{Ak}$ and EnergyRcv$_{Ak}$ are captured by the network element A, the features are actually the feature attributes of the next-level network elements, i.e., k1 and k2;

above two feature data do not belong to the network element A; and the captured information is added to the feature attributes of k1 and k2;

Feature9: Rate$_{forward}$, with the weight of weight$_9$;

a learning process is summarized as follows:

the features are selected as follows:

$$v_{icmp1} = \frac{a}{(\text{Timestamp}_a - \text{Timestamp}_1)}, \quad \text{Feature 1}$$

with the weight of weight$_1$;

Feature2: Num$_{topo}$ (the number of topology changes/establishments in a time period), with the weight of weight$_2$;

Feature3: Num$_{sub}$ (the number of sub-network elements calculated by a parent network element), with the weight of weight$_3$;

Feature4: $\Delta$CON=|CON$_{proxy}$=CON$_{IDS}$|, with the weight of weight$_4$;

Feature5: $\Delta$ack=|ack$_{proxy}$−ack$_{IDS}$|, with the weight of weight$_5$;

$$v_{icmp2} = \frac{b}{(\text{Timestamp}_{b'} - \text{Timestamp}_{1'})}, \quad \text{Feature 6}$$

with the weight of weight$_6$;

Feature7: Rcv$_{Ak}$, with the weight of weight$_7$;

Feature8: EnergyRcv$_{Ak}$, with the weight of weight$_8$;

Feature9: Rate$_{forward}$, with the weight of weight$_9$;

weights assigned to each feature by the console are multiplied by corresponding feature data, and a result of adding all feature data assigned to the weights can effectively reflect the state of the network element;

at this point, the feature data of the network elements has been quantitatively analyzed in terms of features and typical attacks of the 6LoWPAN network, a qualitative analysis on a selection of the features, states of the network elements and specific indicators of an action execution of the network elements in the network, and a quantitative analysis on feature data of the network elements have been completed.

3. The improved KNN-based 6LoWPAN network intrusion detection method according to claim 1, characterized in that: the direct judgment method based on the feature of a certain network element is that: in the process of acquiring the feature of the network element, directly judging, by the intrusion detection system, whether the intrusion exists by one of the acquired features of network elements, wherein selection and capturing modes of the features of network elements are specifically that:

1) RA address prefix each time a 6R network element sends a RA message, an intrusion detection auxiliary device 1 is close to the 6R network element, captures the RA message in the $T_0 \rightarrow T_1$, $T_1 \rightarrow T_2$ and $T_2 \rightarrow T_3$ time periods respectively, and parses and compares the RA message contents; and captures different messages from the 6R, wherein the address prefixes are respectively:

prefix$_1$,prefix$_2$, . . . ,prefix$_n$ the intrusion detection auxiliary device 1 sends this message to the console, which parses the message and extracts an address prefix, and performs an XOR operation on the address prefix;

if prefix$_1 \oplus$prefix$_2 \oplus$ . . . $\oplus$prefix$_n$=1, the console directly judges that the 6R network element is abnormal;

if prefix$_1 \oplus$prefix$_2 \oplus$ . . . $\oplus$prefix$_n$=0, the 6R network element is normal;

2) RA message frequency in addition, the intrusion detection auxiliary device 1 statistically monitors the frequency of the RA message that the 6R network element occurs in $T_0 \rightarrow T_1$, $T_1 \rightarrow T_2$ and $T_2 \rightarrow T_3$ time periods, which is expressed as v$_{na}$: supposing that the 6R network element is under normal condition, the occurrence frequency of the RA message is v$_{limit-na}$, if v$_{limit-na}$>v$_{na}$, the 6R network element is normal; and if v$_{limit-na}$<v$_{na}$, the console directly judges that the 6R network element is abnormal;

3) NS message frequency the intrusion detection auxiliary device 2 monitors NS messages of subnet intranet elements in $T_0 \rightarrow T_1$, $T_1 \rightarrow T_2$ and $T_2 \rightarrow T_3$ time periods respectively, which is expressed as v$_{ns}$ once any network element receives NS frequency exceeding the limit, the subnet intranet elements are actively detected, that is, the subnet intranet elements send NS messages in reverse; and if NA is not returned, or NA messages from other MAC addresses are received, a behavior is proved to be abnormal, ND table entries are not updated, and the behavior is reported to the console;

supposing that the network element is under normal condition, the frequency limit of the received NS message is v$_{limit-ns}$, and supposing that a source IP address of the received NS message is Address0, the source IP address of the returned NA message is Address1;

if v$_{ns}$>v$_{limit-ns}$, the NS message is sent in reverse;

step 1: if the NA message is not returned, the network element is directly judged to be abnormal; and step 2: if the NA message is returned, the IP address is compared;

Address0$\oplus$Address1=1, the console directly judges that the network element is abnormal;

Address0$\oplus$Address1=0, the network element is normal; and if v$_{ns}$<v$_{limit-ns}$, the network element is normal;

4) Occurrence frequency of GET (get) messages when a customer 6R needs data and sends GET messages, the intrusion detection device 1 needs to statistically monitor the GET messages captured from 6R in $T_0 \rightarrow T_1$ $T_1 \rightarrow T_2$ and $T_2 \rightarrow T_3$ and calculate the occurrence frequency of the GET messages, and once the frequency exceeds the limit threshold, the 6R network element is directly judged to be abnormal;

5) Rank-error bit in RPL packet information an MN receives level information during DIO check, and if the monitoring network element detects any child/parent relationship that breaks a rank rule, the network element with changed rank is abnormal; and this feature means that once the rank value changes, the sent or received network elements along a route check that the rank rule is broken, and the rank-error bit in RPL packet information becomes 1, then it can be directly judged that the network element is directly judged to be abnormal; and this feature means the rank value change is directly judged to be abnormal.

4. The improved KNN-based 6LoWPAN network intrusion detection method according to claim 1, characterized in that: the step S2 is specifically:

1) Constructing a hypercube feature space with continuous fixed size, supposing the hypercube is $C_{ul,\ldots,uq}$ and its diagonal is d/2;

2) Global contour forming process: when feature data of the network elements in the state data table of network elements are filled, calculating a position of a hypercube $C_{ul,\ldots,uq}$ by a console, and calculating the frequency of each hypercube position, i.e., the number of the data in the hypercube, thereby forming a global normal contour;

3) After the global normal contour is formed, performing online detection by the console, k is the parameter in the intrusion detection mechanism, which is specified by the user, wherein if state data of network elements in the hypercube where the state data of network elements are located are greater than k, the states of network elements are normal; or detecting the state data of network elements in a detection area being replaced, wherein if the data are greater than k, the states of network elements are normal;

positioning the state data of network elements in the hypercube feature space and calculating whether the state data of network elements fall into the normal profile by the console.

5. The improved KNN-based 6LoWPAN network intrusion detection method according to claim 1, characterized in that: the step S3 is specifically:

first, forming a part of state data table of network elements in the console;

when the state data of network elements fill in the state data table of network elements at the console end, forming a normal profile in a feature space constructed by the console;

after the state data table of network elements are filled for the first time in the $T_0 \rightarrow T_1$ and $T_1 \rightarrow T_2$ time periods, conducting the first round of detection;

conducting the first round of detection, at the same time, continuing to fill in the state data table of the next round of network elements; when the state data amount of the network element saved by the console in $T_2 \rightarrow T_3$ reaches i/p, randomly selecting, by the console, the state data of network elements saved in $T_2 \rightarrow T_3$ time period at the probability p, filling the state data of the selected network elements into the state data table of network elements, and discarding remaining data; and when the state data table of network elements is completely replaced by new data, sending, by the network element, a request to update the state data table of network elements, and relearning and updating the normal profile;

Specifying that $T_2 \rightarrow T_3$ is a period for updating the state data table of network elements, and the period is fixed; and the 6LoWPAN network adopts a distributed mode of real-time operation;

an operation of the distributed mode requires all sensor nodes to participate in an internal calculation of the network, and the collection of network features needs the cooperation of each network element in the network, instead of being captured by the intrusion detection auxiliary device;

in addition to being captured of the auxiliary device, the feature data of an IPV6 wireless sensor network also has the cooperation of the network elements in the subnet, and following points need to be considered for the scheduling of network resources:

1) Monitoring network element (MN) will monitor the communications from the neighbor thereof, comprising parent network element and child network element thereof;

2) The network element is actively detected, that is, the network element sends the NS message in reverse, and passes through a temporarily applied GTS time slot;

3) Finally, the network element A simply sends the $Rate_{forward}$, EnergySent, $Rcv_{Ak}$, $EnergyRcv_{Ak}$ and EnergyTotalRcv information to the gateway;

4) A detection module of each network element performs the local normal profile detection, and finally uploads an abstract to a cluster-head network element;

5) The cluster-head network element also needs to send the global normal profile to each network element;

6) Each proxy network element RFD detects the CON/GET/ACK message rate;

in addition, above 6 points that need to be considered occur in parallel, and tasks of some network elements are multiple, and the above 6 points need to be considered simultaneously in time slot allocation, so that communication resources can be reasonably configured.

* * * * *